United States Patent [19]

Yagyu et al.

[11] Patent Number: 5,502,640
[45] Date of Patent: Mar. 26, 1996

[54] ROUTE SELECTION METHOD AND APPARATUS THEREFOR

[75] Inventors: Takeshi Yagyu, Osaka; Yoshiki Ueyama, Sakai, both of Japan

[73] Assignee: Matsushita Electric Industrial Co., Ltd., Kadoma, Japan

[21] Appl. No.: 264,246

[22] Filed: Jun. 22, 1994

Related U.S. Application Data

[63] Continuation of Ser. No. 853,562, Mar. 18, 1992, abandoned.

[30] Foreign Application Priority Data

Mar. 19, 1991 [JP] Japan .................................. 3-054538
Sep. 4, 1991 [JP] Japan .................................. 3-223881

[51] Int. Cl.$^6$ .......................... G06G 7/78; G08G 1/123; G01C 21/00
[52] U.S. Cl. .......................... 364/443; 364/444; 364/449; 364/436; 340/995; 340/990; 340/988; 73/178 R
[58] Field of Search .................................. 364/444, 449, 364/443, 436, 450, 448; 340/990, 995, 988; 73/178 R

[56] References Cited

U.S. PATENT DOCUMENTS

| 4,570,227 | 2/1986 | Tachi et al. .............................. 364/444 |
| 4,926,336 | 5/1990 | Yamada .................................. 364/449 |
| 4,937,753 | 6/1990 | Yamada .................................. 340/990 |
| 4,962,458 | 10/1990 | Verstraete .............................. 364/443 |
| 4,984,168 | 1/1991 | Neukrichner et al. .................. 364/443 |
| 5,031,104 | 7/1991 | Ikeda et al. ............................ 364/449 |
| 5,168,452 | 12/1992 | Yamada et al. ........................ 364/444 |
| 5,206,811 | 4/1993 | Itoh et al. .............................. 364/444 |
| 5,220,507 | 6/1993 | Kirson .................................... 340/995 |

FOREIGN PATENT DOCUMENTS

| 0346492 | 12/1989 | European Pat. Off. . |
| 0372840 | 6/1990 | European Pat. Off. . |
| 0393632 | 10/1990 | European Pat. Off. . |
| 2541026 | 4/1984 | France . |
| 2570531 | 3/1986 | France . |
| 59-105113 | 6/1984 | Japan . |
| 2-56591 | 2/1990 | Japan . |
| WO8809974 | 12/1988 | WIPO . |

OTHER PUBLICATIONS

M. Sugie, O. Menzilcioglu and H. T. Kung—National Computer Conference—CARGuide–On–Board Computer for Automobile road guidance Sep. 1984.

Primary Examiner—Kevin J. Teska
Assistant Examiner—Jacques H. Louis-Jacques
Attorney, Agent, or Firm—Cushman, Darby & Cushman

[57] ABSTRACT

A route connecting a point and another point on a network is derived in advance with respect to entire pairs of two points, and the route is stored with a transit point placed on the route in a memory. When a route between two points is retrieved, the route is divided by the transit point, and a route in each division is retrieved. Subsequently, plural routes of the divisions are connected and thus the route between the two points is derived.

18 Claims, 18 Drawing Sheets

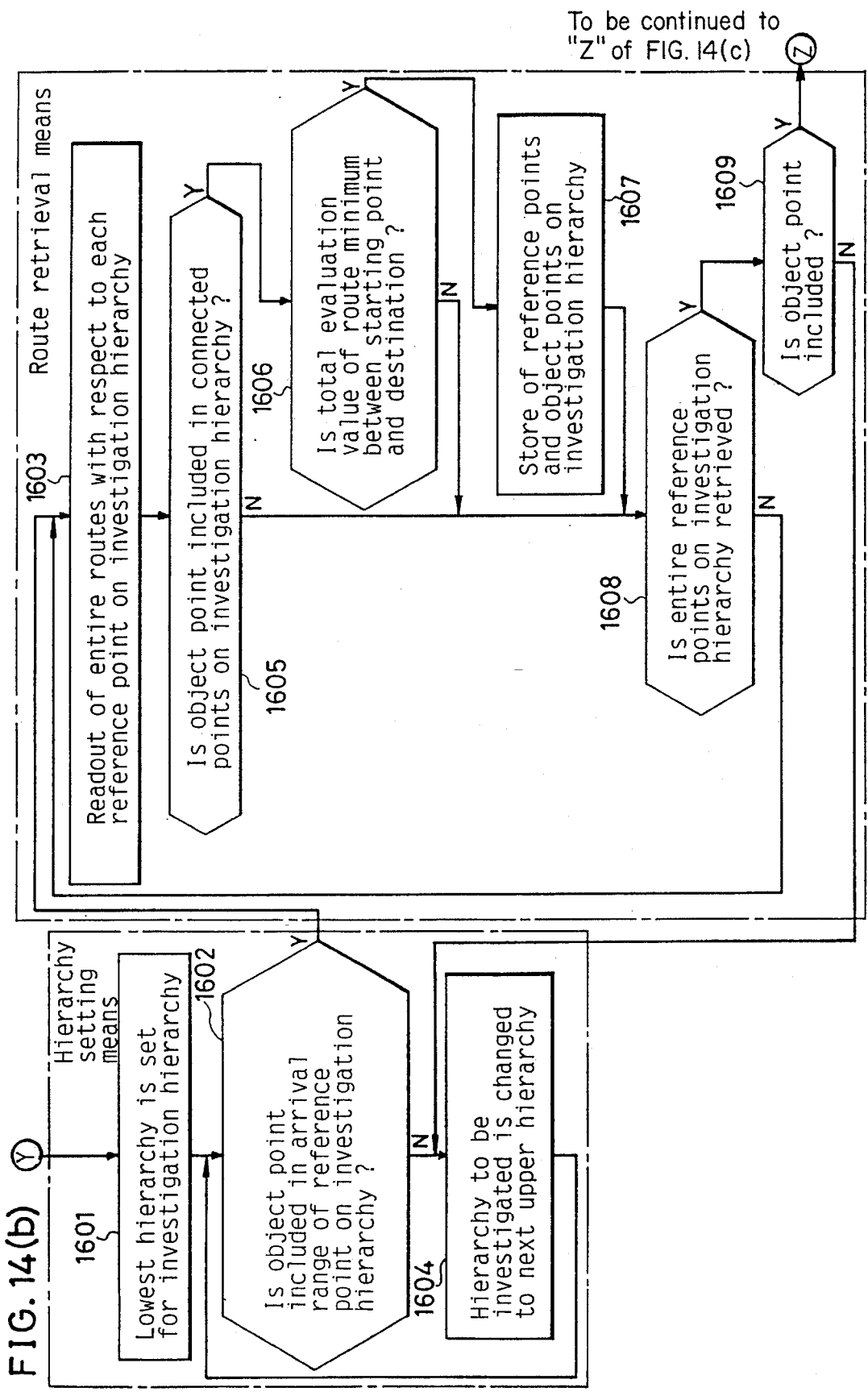

1

ROUTE SELECTION METHOD AND APPARATUS THEREFOR

This is a continuation of application Ser. No. 07/853,562, filed on Mar. 18, 1992 now abandoned.

FIELD OF THE INVENTION AND RELATED ART STATEMENT

1. Field of the Invention

The present invention relates to a route selection method and an apparatus to select an optimum route from a plurality of routes connecting between a starting point and a destination on a connection network such as a road network or a communication network.

2. Description of the Related Art

An example of a route selection apparatus in the prior art is shown in the Japanese published unexamined patent application Sho 59-105113. In the prior art, a starting point and a destination are set in a guidance control apparatus installed on a vehicle. The guidance control apparatus is provided with a device for measuring a position and a course of the vehicle, and thereby a present position and the course of the vehicle which is running on a road are detected. The guidance control apparatus, furthermore, comprises a map scored In a memory including information of junctions of roads, setting points disposed at regular intervals along the roads, and distances among the setting points. An optimum route from the starting point to the destination is derived on the basis of the map. When the vehicle has arrived at a setting point, a direction in which to travel thereafter is then indicated to a driver of the vehicle. The vehicle will arrive at the destination via the optimum route by driving it in compliance with the Indication.

In the prior art, the optimum route between tile starting point and destination is derived by tile known "Dijkstra method". According to the Dijkstra method, "directed routes," on which respective directions are given in advance, are set among junction points of a plurality of roads connecting between the starting point and destination, and respective distances among the junction points are calculated along the directed routes from the starting point to the destination. The route having the shortest distance is selected between the starting point and destination as the optimum route. It is known that a search time in operation of the Dijkstra method increases in proportion to a square of the number of junctions. Therefore, as the number of routes increase, the calculation operation to search an optimum route also increases, and accordingly the search time increases very much.

Another prior art system is shown in the Japanese published unexamined patent application Hei 2-56591 (Tokkai 56591/1990). According this prior art system, data of a road network which is used in route selection operation is arranged in a "hierarchy structure". In the hierarchy structure of tile road network, a trunk line network of road is placed on an upper hierarchy, and a branch line network of road which is connected to the trunk line network is placed on a lower hierarchy, and thereby the road network is classified into plural hierarchies. Moreover, a road network in each hierarchy is divided into a plurality of blocks, and information of junctions, connection information with respect to the roads among the junctions and connection information with respect to a junction in an upper hierarchy are stored as map data at every block of each hierarchy.

In the route selection operation of this prior art system, when a block including a starting point and a block including a destination belong to an upper hierarchy, route selection operation is carried out between both the blocks of the hierarchy. On the other, hand, when the starting point or tile destination belongs to a block of a lower hierarchy, first, a route which is connected to a block of an upper hierarchy is selected, and the route selection operation is migrated to the block of the upper hierarchy. When a first block including the starting point is identical with a second block including the destination, or when the first block is placed adjacent to the second block on the same hierarchy, the route selection operation is completed.

In this prior art system, a block size representing a range of the block is determined so that information included in each block is uniform. Therefore, even if a large amount of information exists owing to a complicated road network, the calculation operation is reduced in comparison with the Dijkstra method because information processing is carried out in each block.

Still other prior art is shown in U.S. Pat. No. 4,984,168. According to this prior art, in order to determine a route between a starting point and a destination within a short time, a digitally memorized road map is divided into at least two levels of different grid density and regional size. A plurality of smaller subregions of fine grid density are assigned to a lower level, and one or more larger subregions of coarser grid density are assigned to a higher level. Beginning with the lower level of the road map, a possible route is searched. If the result are negative, a transition is made to the next-higher level, until a positive result is attained. In determining an optimum route, favorable result are obtained for all possible relationship of starting point and destination.

For instance, when the starting point and destination are in the same part (subregion) of a region, it is suitable for a route to be determined within the subregion. If that is not possible, then an attempt is made to reach the destination via an adjacent subregion. These operations are performed in the same level. If the starting point and destination are far apart, then the major translations between these subregions are ascertained. In the road map, resistance values are assigned to the various roads and intersections. These resistance values, for instance, define a route length, a required travel time, on an average traffic density. If the resistance value is low, the applicable road or connection is used preferentially for route determination. If the resistance value is high, it is not taken into account unless other routes are not favorable.

Constant development in the road network increases the numbers of trunk lines and branch lines connected thereto, consequently complicating the connections among them. Accordingly, information in the road network increases day by day and thus the information processing operation which is necessary to carry out route selection is Increased. Therefore, a route selection apparatus for rapidly selecting an optimum route from the complicated road network has been sought.

OBJECT AND SUMMARY OF THE INVENTION

An object of the present invention is to provide a route selection method and an apparatus therefor in which the information processing operation for selecting an optimum route between a starting point and a destination reduced significantly in a connection network.

The route selection method in accordance with the present invention comprises the steps of:

storing data representing a route between two arbitrary points on a connection network having a plurality of points in an interpoint route memory in advance, designating two points in the points stored in the interpoint route memory, deriving a route between the two points by retrieving the route corresponding to the designated two points, and outputting data of the route between the two points.

The route selection apparatus in accordance with the present invention comprises:

an interpoint route memory for storing data representing routes produced by connecting two points on a connection network having a plurality of points, point input means for designating the two points, route retrieval means for retrieving the route between two points designated by the point input means on the basis of the route corresponding to the two points stored in the interpoint route memory, and output means for outputting route data retrieved by the route retrieval means.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 14(a), 14(b) and 14(c) are flow charts of operation of the sixth embodiment;

It will be recognized that some or all of the Figures are schematic representations for purposes of illustration and do not necessarily depict the actual relative sizes or locations of the elements shown.

DESCRIPTION OF THE PREFERRED EMBODIMENTS

[First embodiment]

Figure 1:
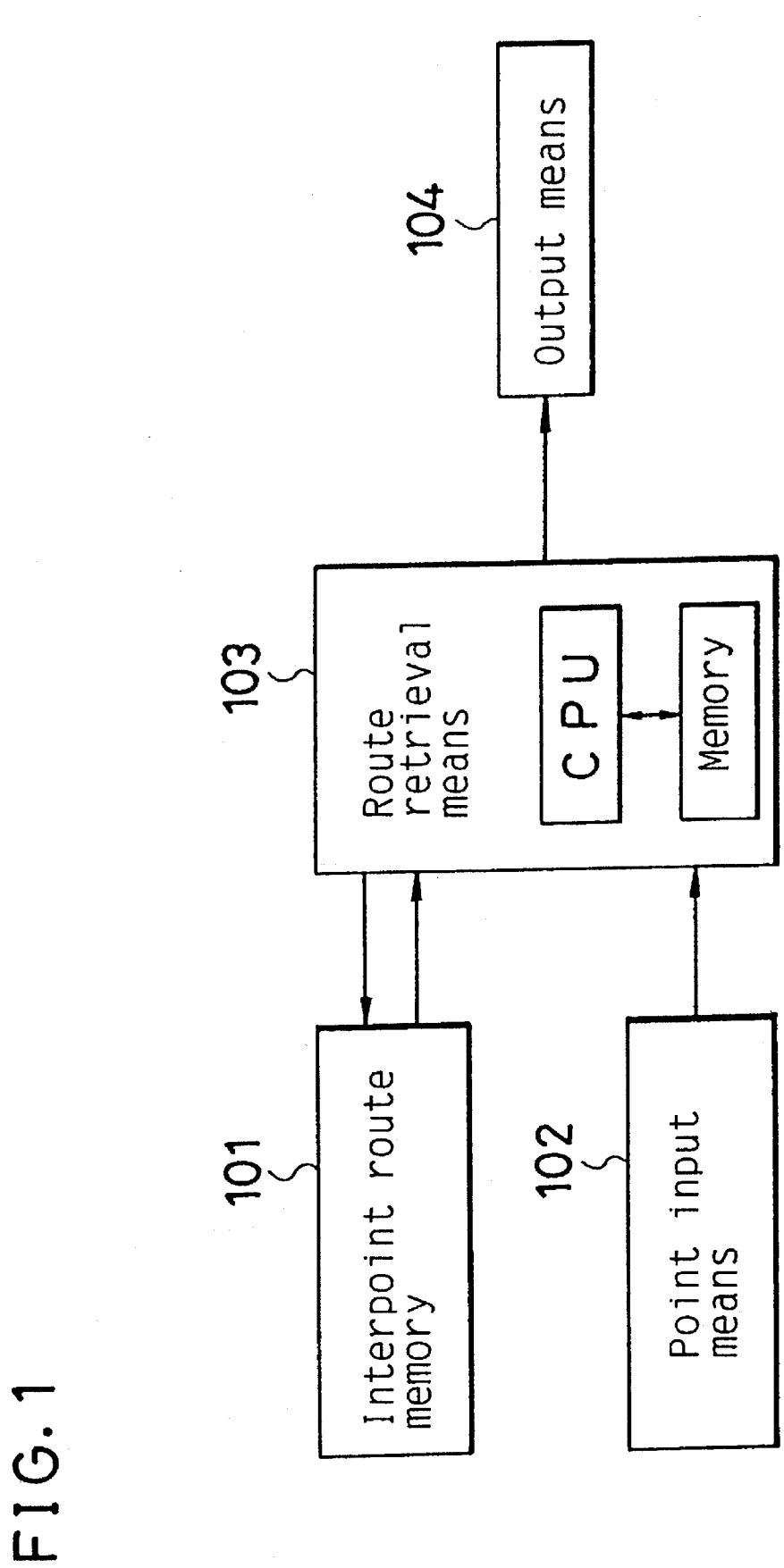
FIG. 1 is a block diagram of a first embodiment of a route selection apparatus In accordance with the present invention.

FIG. 1 is a block diagram of a route selection apparatus of a first embodiment In accordance with a present invention. An "interpoint route memory 101" is a memory means such as a CD-ROM which stores data of entire routes among entire points on a road network in advance. "Point input means 102" is an input apparatus for designating two points (a starting point and a destination) to derive a route from among the points stored in the interpoint route memory 101. The point stored in the interpoint route memory 101 is named as "route store point". The data of the entire routes among the route store points are stored in the interpoint route memory 101.

"Route retrieval means 103" comprising a CPU and a memory is to retrieve a route between the designated two points from among the data stored in the interpoint route memory 101.

"Output means 104" is an output device such as a display device for displaying a route retrieved by the route retrieval means 103. The output means 104 may be a voice outputting device for indicating the route by voice. The output device can be constituted to indicate the route by image or voice by combining it with a present position detection apparatus representing a present position of a vehicle.

The point input means 102 for designating the starting point and destination comprises a display device for displaying a map and the route store points in the map on the same display. An operator or a driver of the vehicle selects two points for the starting point and destination from among the route store points displayed on the display device. The designated starting point and destination are inputted to the route retrieval means 103, and a combination of the starting point and destination is retrieved from among combinations of two points on the network stored in the interpoint route memory 101, and thus a route corresponding to the combination is read out. The route data is output to the output means 104.

Figure 2:
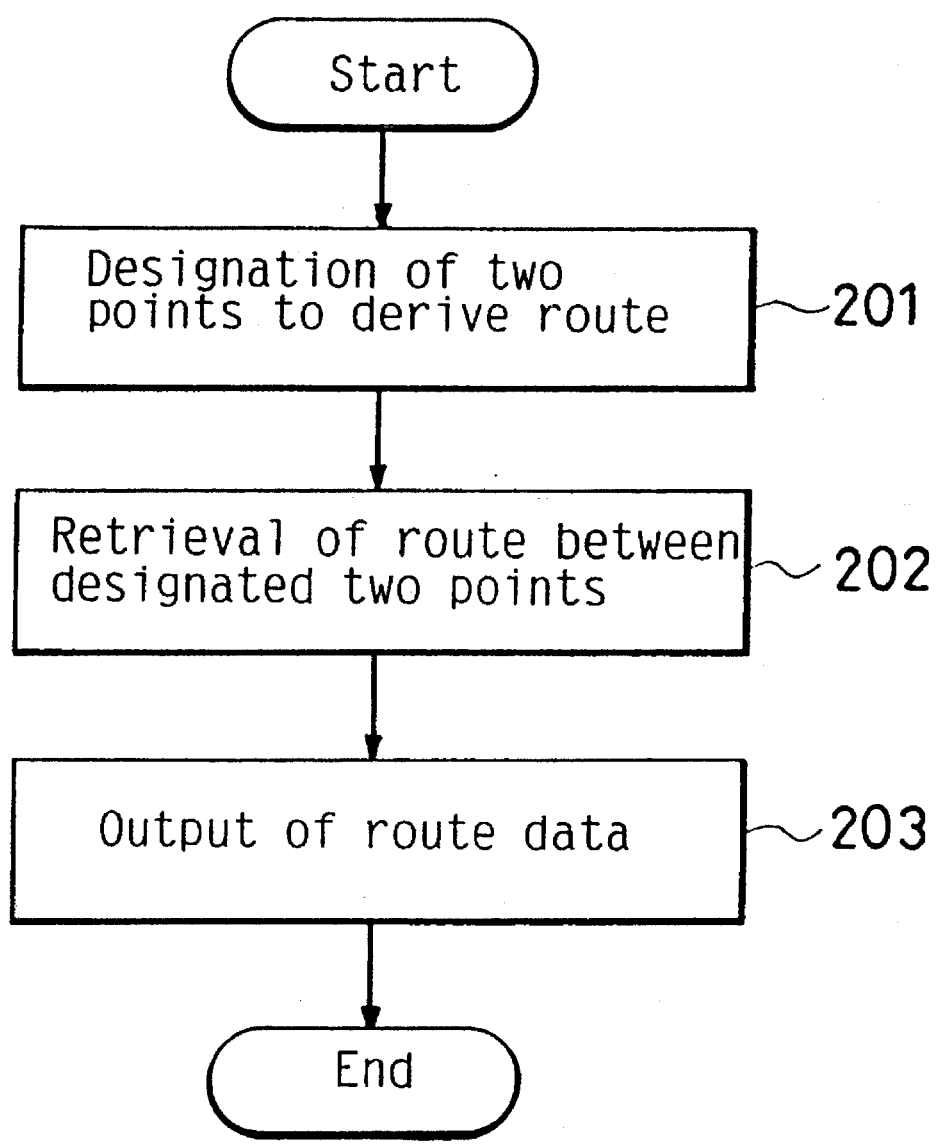
FIG. 2 is a flow chart of the operation of the first embodiment.

Operation of the route selection method In the first embodiment is shown In a flow chart of FIG. 2. A starting point and a destination to derive a route are selected from among the route store points and are designated at step 201. At the step 201, the route between the designated two points is retrieved from among the data stored routes among entire points, and a retrieved route is output at step 203.

Figure 3:
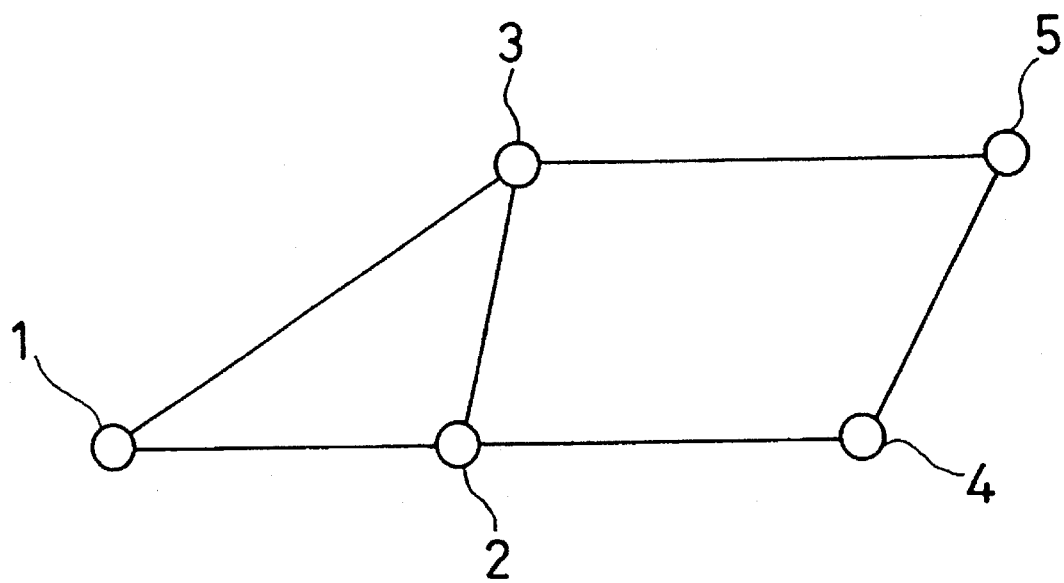
FIG. 3 is an example of a road map in the first embodiment.

Detailed operation of the first embodiment is elucidated by using an example hereafter. FIG. 3 is a diagram of a road network representing routes connecting among five points 1, 2, 3, 4 and 5. Entire routes connecting are produced by connecting among the five points are predetermined by designating one of five points as a starting point and the other thereof as a destination, and the data of the entire routes are stored in the interpoint route memory 101 as "interpoint route data". An example of the interpoint route data is shown in Table 1.

TABLE 1

| Interpoint route data | | |
|---|---|---|
| Combination of points | | |
| Starting point | Destination | Transit point |
| 1 | 2 | — |
| 1 | 3 | — |
| 1 | 4 | 2 |
| 1 | 5 | 3 |
| 2 | 1 | — |
| 2 | 3 | — |
| 2 | 4 | — |
| 2 | 5 | 4 |
| 3 | 1 | — |
| 3 | 2 | — |
| . | . | . |
| . | . | . |
| . | . | . |
| 5 | 2 | 4 |
| 5 | 3 | — |
| 5 | 4 | — |

In Table 1, combinations of two points selected from five points are shown in a comprehensive column of "combination of points", for example. Numerals in the heft column thereof represent starting points and numerals in the right column represent destinations (the numerals in the right column are allowed to be the starting points and the numerals In the left column are allowed to be the destinations). Numerals in the column of "transit points" represent a transit point between two points shown on the same row in the comprehensive column of the combination of points. The combination of points having no transit point is represented by "—". The transit points is one of the route store point.

In the first embodiment, as shown in the Table 1, a route which is formed by a combination between two arbitrary points is stored with respect to entire combinations of the points on the network and one point on the respective routes is also stored. When the point 1 is a starting point and a point S is a destination, for example, the combination of these two points 1 and 5 is retrieved in the column of the combination of the points, and a route transit point corresponding to the combination of these two points 1 and 5 is retrieved in the column of the transit point of the Table 1. In the above-mentioned example, a point 3 is retrieved in the column of the route transit point of the Table 1. Consequently, the route from the point 1 to the point 5 is determined as "point 1 → point 3 → point 5".

In the storing operation of the routes among entire points on the network, the routes which are predetermined by the Dijkstra method or the like using the road network can be stored therein. The road network data includes data of positions of points and connection relations among these points. Moreover the routes may be derived by hand on the basis of an ordinary human sense.

In the first embodiment, the route between two points is obtained by combination of plural transit points. Combination of the route transit points with respect to combination of the two points is shown in Table 2.

TABLE 2

| Combination of points | Combination of route transit points | | |
|---|---|---|---|
| 1-5 | 2 | 3 | 4 |
| 1-4 | 2 | 3 | |
| 1-3 | 2 | | |

As shown in Table 2, For example, three route transit points 2, 3 and 4 need to be stored with respect to the route between the points 1 and 5. Therefore, the data of the transit points rapidly increase in accordance with increase of the number of point. For this reason, the route selection apparatus in the first embodiment is suitable for the road network having relatively small number of points.

[Second embodiment]

The second embodiment of the route selection method and apparatus is directed to greatly reduce the data of routes to be stored in the interpoint route memory 101 in comparison with the first embodiment. Hardware structure in the second embodiment is substantially identical with that of the first embodiment. In the second embodiment, at least one point on the way of a route is stored in the interpoint route memory 101, as a "transit point". The data of the transit point is included in the data of the routes among points on the road network. And when a route between designated two points is derived, the route is divided into plural sub-routes by putting the transit point on the way of the route as a boundary point. Then a further transit point is determined between the designated point and the boundary point.

Figure 4:
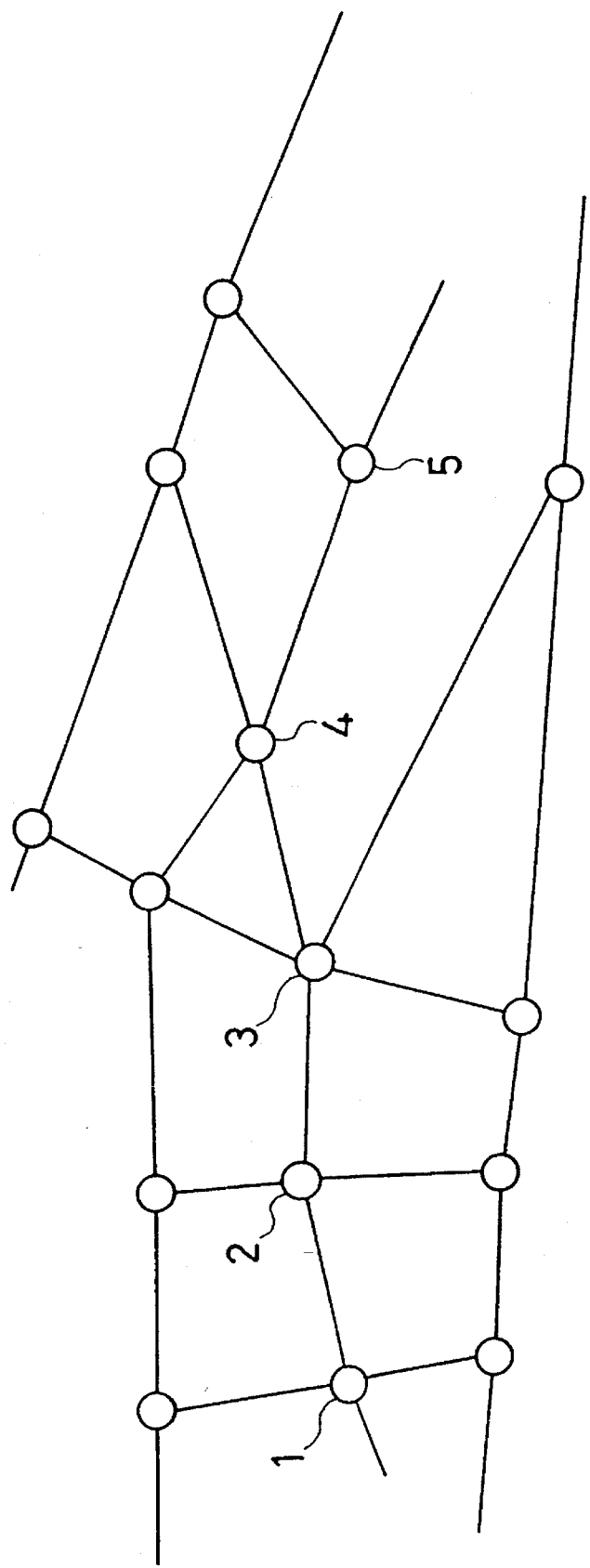
FIG. 4 is an example of a road map in a second embodiment of the route selection apparatus in accordance with the present invention.

FIG. 4 is an example of a road map of a route including five points 1, 2, 3, 4 and 5. A combination of points (the point 1 is a starting point) and transit point (corresponding) to the combination are predetermined as shown in Table 3.

TABLE 3

| Combination of points | Transit point |
|---|---|
| 1-5 | 4 |
| 1-4 | 3 |
| 1-3 | 2 |
| 1-2 | |

The data shown in the Table 3 are stored in the interpoint route memory 101.

Retrieval operation of a route in the second embodiment is elucidated hereafter. After the two points (starting point and destination) to derive a route are designated, in the route retrieval means 103, the combination of the two points is retrieved from combinations among the entire points on the network stored in the interpoint route memory 101. Then a first transit point corresponding to the combination of the two points is read out. Subsequently, a combination of the starting point and the first transit point is retrieved, and hence a second transit point corresponding to the combination of the starting point and the first transit point is read out. In the same way, a third transit point corresponding to the combination of the starting point and the second transit point is read out. Furthermore, a fourth transit point is retrieved based on the combination of the destination and the first transit point, and a fifth transit point is also retrieved based on the combination or the first and second transit points.

As mentioned above, according to the second embodiment, the respective transit points corresponding to the combination of the starting point and a transit point, a combination of two transit points and the combination of the transit point and the destination are stored in the interpoint route memory 101. And points on the route between the starting point and the destination are determined by retrieving them In the interpoint route memory 101 by the route retrieval means 103. Consequently, the route between the starting point and the destination is determined by a chain of a plurality of transit points, the starting point → first transit point → a second transit point → a third transit point . . . the destination. The derived route is output from the output means 104.

An example of route retrieval operation is shown in Table 4. In the Table 4, for the sake of simplicity, the point 1 of five points 1, 2, 3, 4 and 5 is designated as the starting point, and the point 5 is designated as the destination. In the example, a point located adjacent to the destination between the starting point and destination is selected for a transit point.

TABLE 4

| | Combination of points | Transit point | Chain of transit points | | | | |
|---|---|---|---|---|---|---|---|
| Step 1 | 1-5 | 4 | 1 | | | 4 | 5 |
| Step 2 | 1-4 | 3 | 1 | | 3 | 4 | 5 |
| Step 3 | 1-3 | 2 | 1 | 2 | 3 | 4 | 5 |
| Step 4 | 1-2 | — | 1 | 2 | 3 | 4 | 5 |

In order to derive a route from the starting point to the destination, first, combination of the point 1 and the point 5 is retrieved (hereinafter, a route from the point 1 to the point 5 is represented by "combination 1–5"), and a transit point 4 corresponding to the combination 1–5 is derived at step 1 of the Table 4. Subsequently, at step 2, combination 1–4 is retrieved and a resultant transit point 3 is derived. In a similar manner at step 3, combination 1–3 is retrieved, and a resultant transit polar 2 is derived. Finally at step 4, combination 1–2 is retrieved. If no transit point is stored with respect to the combination 1–2, the route between the points 1 and 5 is represented by a chain of the transit points 4, 3 and 2. "Chain of transit point" in the right column of Table 4 represents route derived in each step.

According to the second embodiment, in order to select a route between two points, only one point on the way of a route is stored in the interpoint route memory 101 in advance. Therefore, data for storing the route is greatly reduced in comparison with the first embodiment.

In the example shown in the Table 3, a point located adjacent to the destination is selected for a transit point, but a point located adjacent to the starting point can be selected for a transit point. In this case, a chain of the transit points is derived in the order directed from the starting point to the destination.

[Third embodiment]

Figure 5:
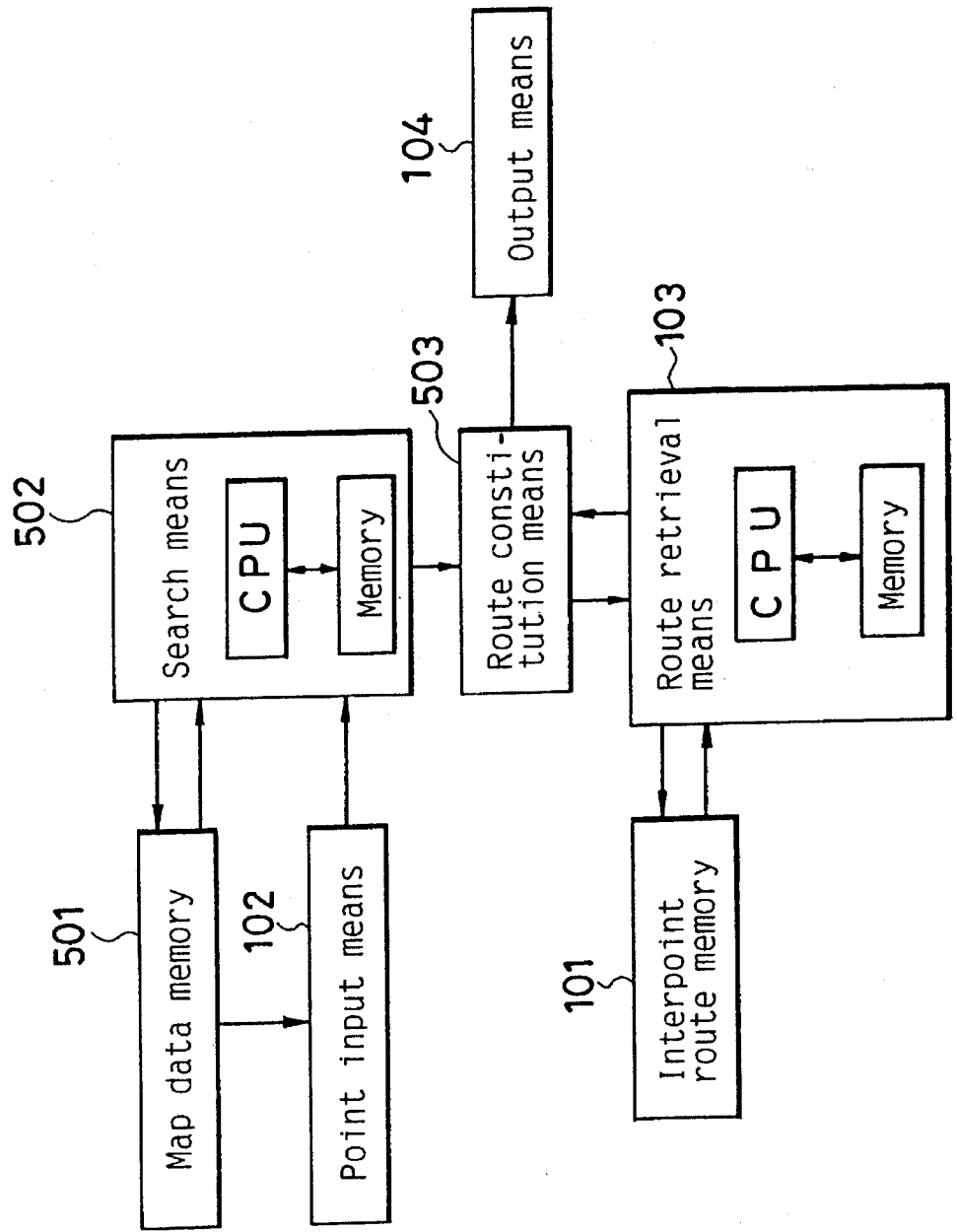
FIG. 5 is a block diagram of a third embodiment of the route section apparatus in accordance with the present invention.

In the case that two points to derive a route are minor points which are not stored in the Interpoint route memory 101, the route can be derived by storing such points in a map data memory 501 in the third embodiment See FIG. 5. In the map memory 501, connection relations (which is represented by a route store point) between neighboring two points in the minor points are stored in addition to the connection relations between neighboring two points in the points stored in the interpoint route memory 101. Routes among more points than that in the first embodiment can be derived by combining data of the map data memory 510 with the data of the Interpoint route memory 101.

FIG. 5 is a block diagram of a route selection apparatus in the third embodiment of the present invention. The interpoint route memory 101, point input means 102, route retrieval means 103 and output means 104 have the same configuration and function as those of the first embodiment.

The map data memory 501 stores the route store points stored in the interpoint route memory 101 and the route store points of minor points which are not stored in the interpoint route memory 101. The map data memory 501 further stores road information such as connection between the minor point and the point stored In the interpoint route memory, and data of travel times for traveling the routes.

Search means 502 comprises a CPU and a memory, and searches a route from a "starting point" to a "route store point adjacent to the starting point" which defined as a route store point that is located adjacent to the starting point, and a route from a destination to a "route store point adjacent to the destination" by using network data read out from the map data memory 501. Then the route between both the route store points is retrieved by the route retrieval means 103. The route from the starting point to the route store point adjacent to the starting point and the route from the destination to the route store point adjacent to the destination and the route between both the route store points are connected by route constitution means 503. Consequently, the route from the starting point to the destination is derived.

An outline of the operation in the block diagram shown in FIG. 5 is elucidated hereafter. Network data in the map data memory 501 is read out by the point input means 102, and an operator designates using the point input means 102 two points to derive a route on the network.

In the search means 502, the network data representing the neighborhood of the starting point is read out from the map data memory 501 in correspondence to the designated starting point, and a first route from the starting point to a route store point adjacent to the starting point is searched by the Dijkstra method, for example. In the above-mentioned search operation, if the operator intends to seek a route having a shortest travel time, such order can be inputted to the point input means 102. A second route from the destination to a route store point adjacent to the destination is searched by using the network data representing the neighborhood of the destination.

The data of the first route between the destination and the route store point adjacent to the starting point and the data of the second route between the destination and the route store point adjacent to the destination are inputted to the route constitution means 503. Then, in the route retrieval means 103, a third route between the route store point adjacent to the starting point and the route store point adjacent to the destination is retrieved from the data stored in the interpoint route memory 101 on the basis of the combination of the route store point adjacent to the starting point and the route store point adjacent to the destination which are inputted from the route constitution means 503. And thus the third route is derived in a similar manner shown in the first and second embodiments.

Subsequently, in the route constitution means 503, the first route, second route and third route are connected into one route in the named order, and the route from the starting point to the destination is completed. The completed route is output from the output means 104.

Figure 6:
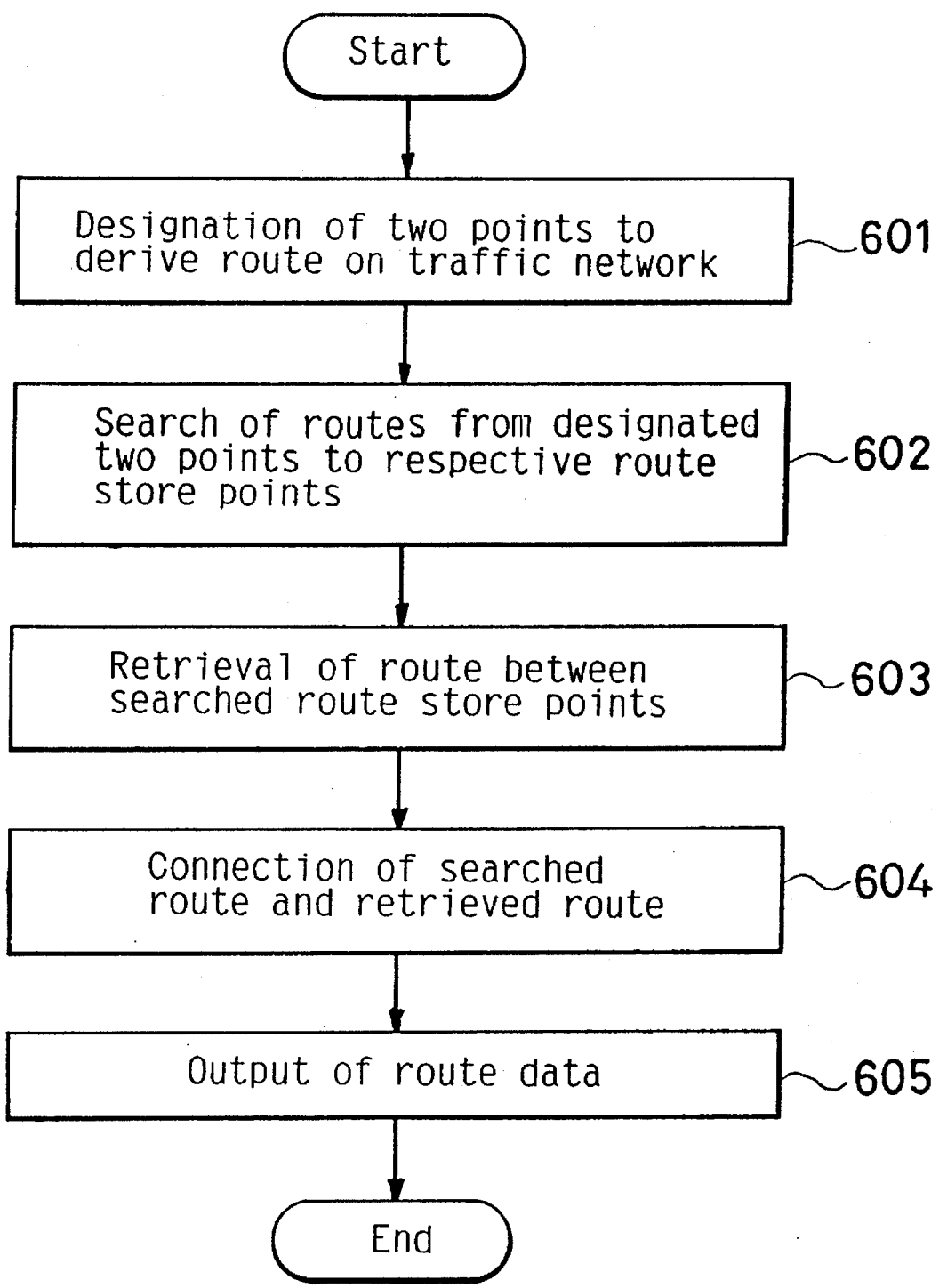
FIG. 6 is a flow chart of the third embodiment.

FIG. 6 is a flow chart of operation of the route relation method In the third embodiment. First, two points (starting point and destination) to derive a route are designated at step 601 (operation in the point input means 102). At step 602, a first route from the starting point to the route store point adjacent to the starting point and the second route from the destination to the route store point adjacent to the destination are searched, and the route store point adjacent to the starting point having the first route to the starting point is determined, and the route store point adjacent to the destination having the second route to the destination is also determined (operation of the search means).

At step 603, the third route between the route store point adjacent to the starting point and the route store point adjacent to the destination is retrieved in the data of the route stored in the interpoint route memory 101 (operation of the route retrieval means 103). The retrieval is carried out based on the combination of the first route store point and the second route store point determined at step 602. At step 604, three routes of the first, second and third routes are connected to one route, and the route from the starting point to the destination is derived (operation or the route constitution means 503). Finally the derived route is output at step 605 (operation of the output means 104).

Figure 7:
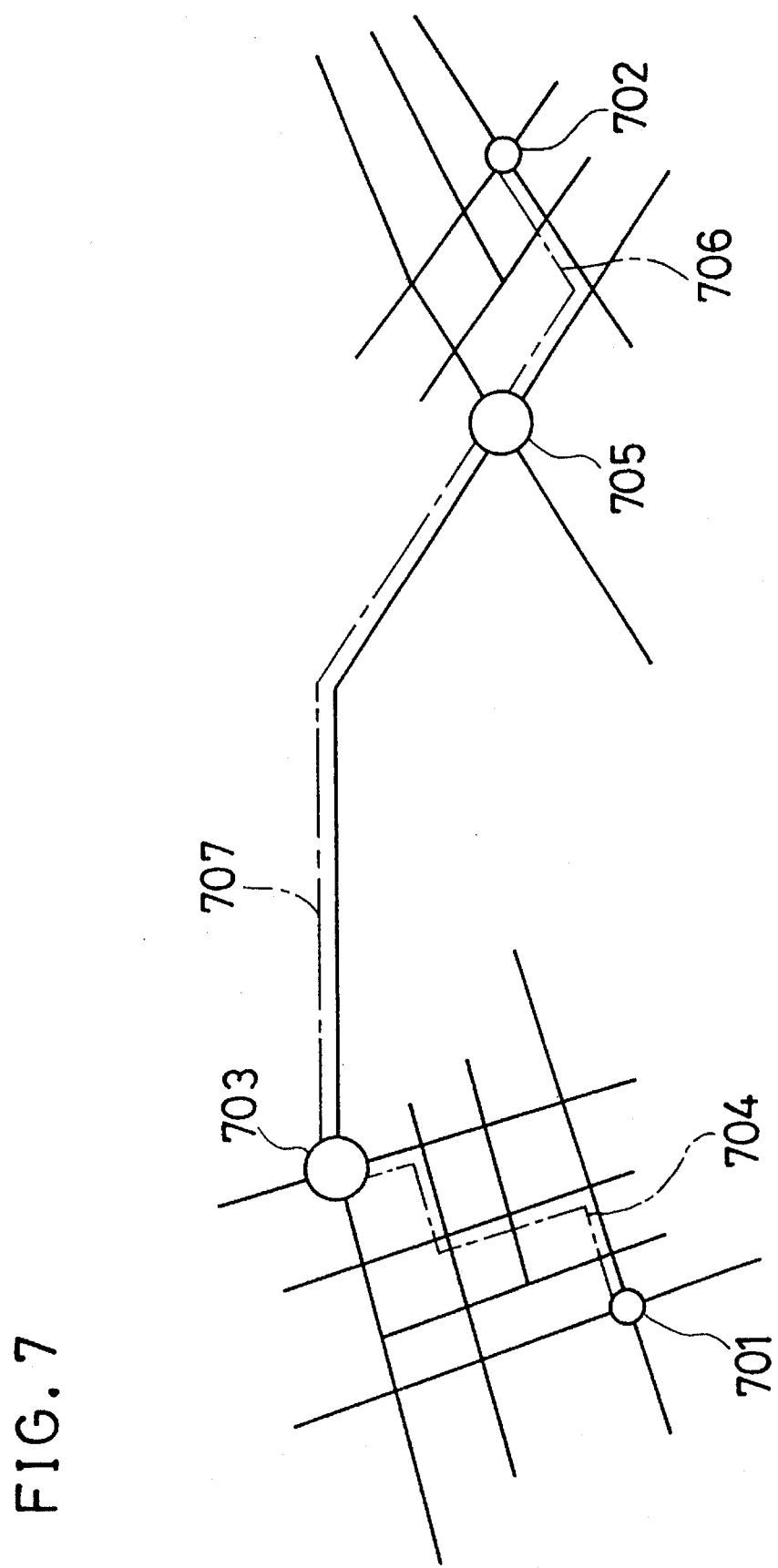
FIG. 7 is an example of a road map of a fourth embodiment in accordance with the present invention.

Hereafter, detailed operation of the route selection apparatus of the third embodiment is elucidated by using a road map shown in FIG. 7. Referring to FIG. 7, a point 701 is the starting point, a point 702 is the destination, a point 703 is the route store point adjacent to the starting point. First, a route 704 between the point 701 and the point 703 is searched from the starting point (point 701) to the route store point adjacent to the starting point (point 703) on the basis of the network data stored in the map data memory 501. Subsequently, a point 705 is the route store point adjacent to the destination, and a route 706 between the destination (point 702) and the route store point adjacent to the destination (point 705) is searched on the basis of the map data stored In the map data memory 501. Finally, a route 707 between the points 703 and 705 is retrieved in the interpoint route memory 101 as a route corresponding to combination of the point 703 and point 705.

After the starting point (point 701) and the destination (point 702) has been set first, the network data in the neighborhood of the starting point (point 701) is read out, and a point which is connected to the point 701 on the network is searched from the starting point of the point 701 toward the point 702. For example, in order to derive a route having the shortest travel time, a route store point which can be arrived from the point 701 with the shortest travel time have been searched on the network, and a route store point 703 is selected for the route store point adjacent to the starting point. The derived route 704 between the point 701 and the point 703 is stored in the search means 502.

In a similar manner, network data of the map in the neighborhood the destination (point 702) is read out, and a point which is connected to the point 702 on the network of the map is searched from the point 702 toward the point 701. When a route store point having the shortest travel time is derived on the network, the route store point is selected for a route store point (point 705) adjacent to the destination, and a route 706 is derived. The derived route 706 is stored in the search means 502. Then a route between the points 703 and 705 is retrieved in the interpoint route memory 101, and the route 707 stored corresponding to the combination of the points 703 and 705 is derived. Finally, three routes 704, 707 and 706 are connected to one route in the named order, and thus the route from the starting point (point 701) to the destination (point 702) is determined.

As mentioned above, according to the third embodiment, since the map data memory 501 is provided, even If a point which is not included in the route store points stored in the interpoint route memory 101 is selected for a starting point or a destination, a route from the starting point to a route store point can be derived by searching It in the map data memory 501. Therefore, the number of point to be designated to derive a route greatly increases in comparison with those of the first and second embodiments.

In the above description of the third embodiment, though a shortest travel time is a criterion in selection of a route, the criterion may be a distance between the starting point and the destination. Moreover, selection of a route which is easy to run may be the criterion as replacement for the shortest travel time or the distance. Information of "one way traffic" or information for "prohibiting approach" may be added to data of the connection relation, and a route including these Information can be derived.

[Fourth embodiment]

The fourth embodiment is directed to provide the route selection method and apparatus by which an operator can select a desirable route from plural routes on the basis of an advantageous evaluation value such as a shortest travel time. The block diagram of the route selection apparatus in the fourth embodiment is identical with that of the third embodiment as shown in FIG. 5. The map data memory 501, the point input means 102 and the output means 104 are identical with those of the third embodiment in configuration and operation. The interpoint route memory 104 in the fourth embodiment stores routes corresponding to combinations of two points and travel times or distances between these two points. In the search means 502, plural routes from a starting point to at least two route store points adjacent to the starting point are searched, and plural routes from a destination to at least two route store points adjacent to the destination are also searched. The searched routes are applied to the route constitution means 503.

Then, routes of entire combinations among plural route store points adjacent to the starting point and plural route store points adjacent to the destination are retrieved by the route retrieval means 103 on the basis of the searched routes, and plural routes from the starting point to the destination are selected from routes searched by the search means 502 and are stored therein. In the route retrieval means 103, a route on the basis of a travel time or a distance between two points inputted from the route constitution means 503 is retrieved in the interpoint route memory 101.

Subsequently, an outline of operation in the fourth embodiment to derive a route laving a shortest travel time is elucidated hereafter. First, two points (starting point and destination) designated by the operator on a road network are set with the point input means 102. In the search means 502, the network data in the neighborhood of the starting point are read out from the map data memory 501 in correspondence to the starting point, and a predetermined number of route from the starting point to the predetermined number of the route store points adjacent to the starting point are searched.

In a similar manner, a predetermined number of route from the destination to the predetermined number of route store points adjacent to the destination are also searched. The data of the routes among the starting point and the plural route store points adjacent to the starting point and the routes among the destination and the plural route store points adjacent to the destination are inputted to the route constitution means 503. Then the respective travel times of routes among the plural route store points adjacent to the starting point and the plural route store points adjacent to the destination are derived by the route retrieval means 103.

Figure 8:
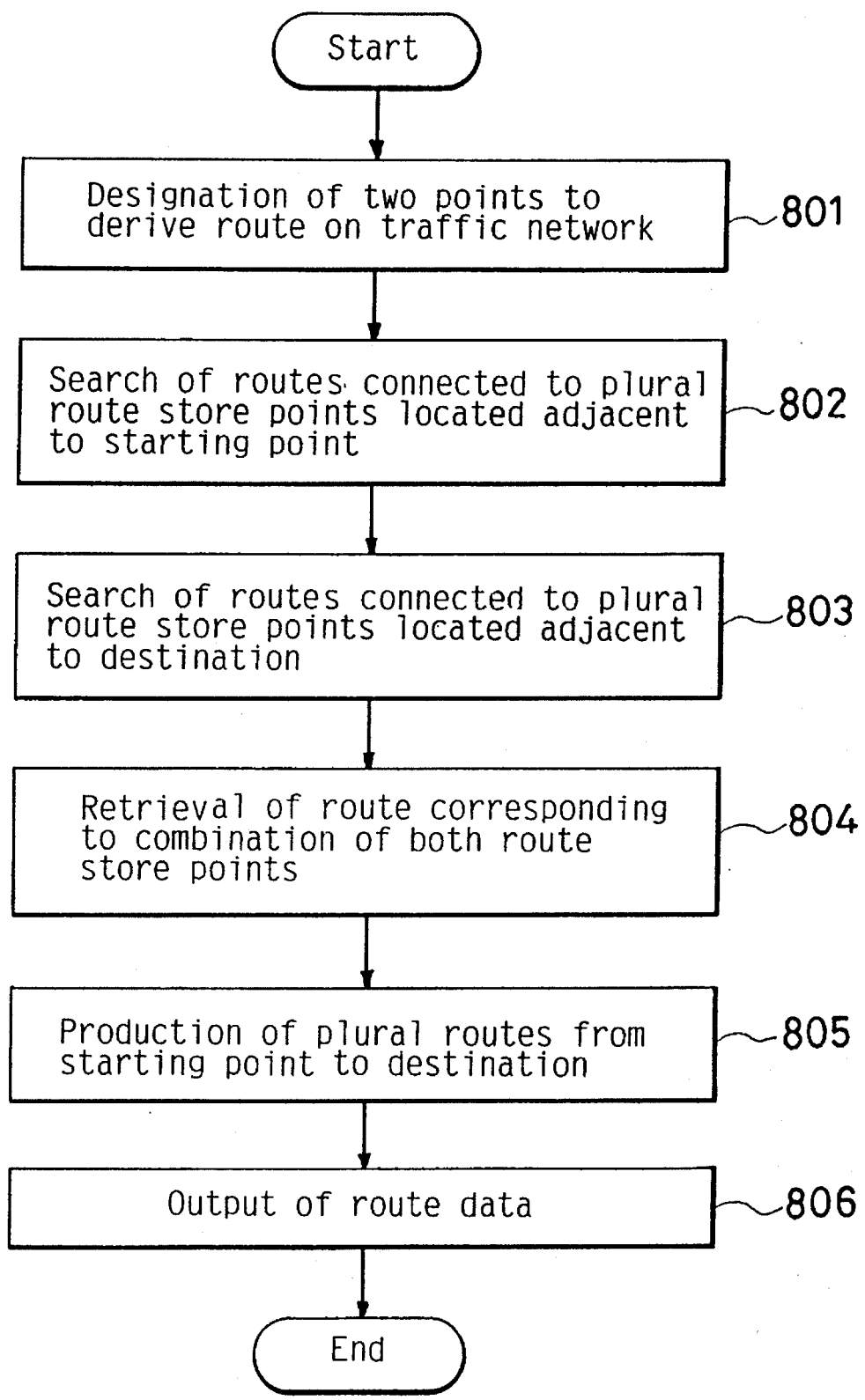
FIG. 8 is a flow chart of the fourth embodiment.

FIG. 8 is a flow chart of the outline of the operation of the route selection method In the fourth embodiment. First, at step 801, two points to derive a route are selected from the points on the network (operation of the point input means 102). Second, at step 802, routes from the starting point to plural route store points adjacent to the starting point are searched by using the road network data in the neighborhood of the starting point. At step 803, routes from the destination to plural route store points adjacent to the destination are searched by using the network data in the neighborhood of the destination (operation of the search means 502).

At step 804, entire routes formed by combinations from among the route store points adjacent to the starting point and the route store points adjacent to the destination are retrieved (route retrieval means 103). Then at step 805, plural routes from the starting point to the destination are derived from the routes searched at the steps 802 and 803 and the routes retrieved at the step 804 (operation of route constitution means 503). Finally, the derived routes are output at step 806 (operation of the output means 104).

Figure 9A:
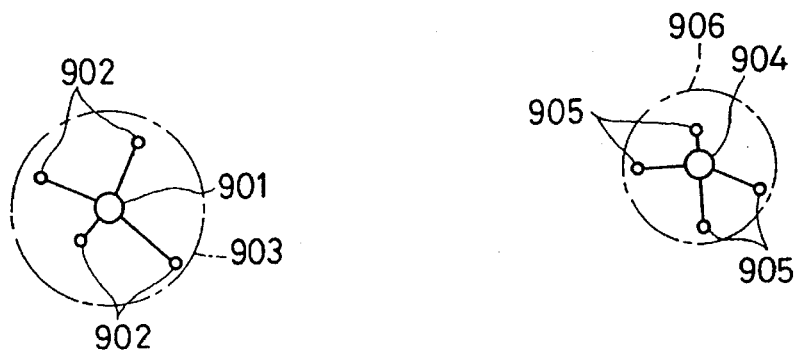
FIGS. 9(a), 9(b), 9(c) and 9(d) represent routes in the fourth embodiment.

FIGS. 9(a), 9(b), 9(c) and 9(d) are diagrams of routes between a starting polar 901 and a destination 904. Detailed operation of the route selection apparatus in the fourth embodiment is elucidated hereafter. Referring to FIG. 9(a), four route store points 902 adjacent to the starting point 901 are selected in the neighborhood of the starting point 901. The range of the neighborhood of the starting point 901 is shown by a circle 903, and search of the route store points are carried out in the range of the circle 903. In a similar manner, four route store points 905 adjacent to the destination 904 are selected in the range of a circle 906. The search of the route store points is carried out In the range of the circle 906 by using the road network data. In search operation, the range to be searched is enlarged so that a predetermined number of the route store point (for example four in the above-mentioned cases) can be derived by searching routes from the starting polar 901 to a route store polar 902. These route store points 902 adjacent to the starting point searched as mentioned above, are stored in the search means 502. In a similar manner, the range to be searched and the route store points 905 adjacent to the destination 904 are derived.

Figure 9B:
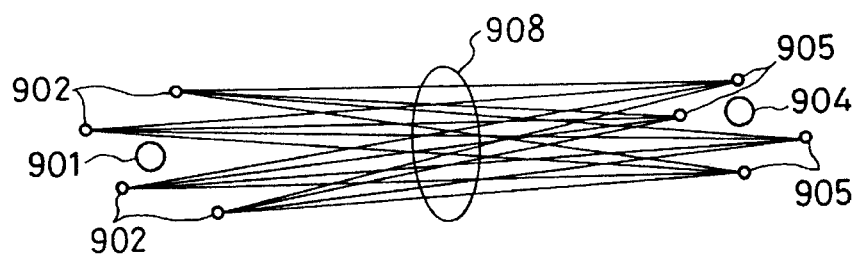

Subsequently, plural routes among the route store points 902 adjacent to the starting point 901, and the route store points 905 adjacent to the destination 904 are retrieved by the route retrieval means 103 as shown in FIG. 9(b). Referring to FIG. 9(b), four route store points 902 are combined with the four route store points 905, and entire combinations among them are retrieved by the route retrieval means 103. Consequently, sixteen routes 908 are derived among the four route store points 902 and the four route store points 905.

Figure 9C:
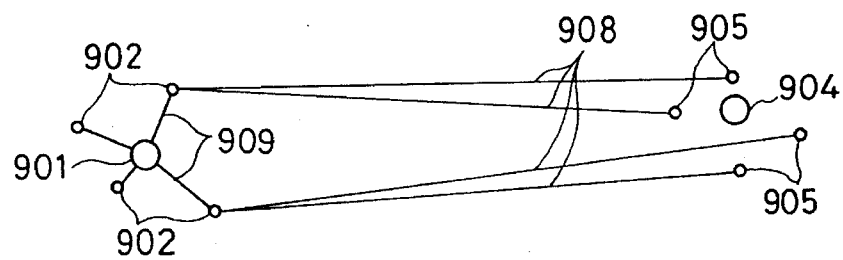

Then, suitable routes from the starting point 901 to the route store points 905 adjacent to the destination 904 are selected from the sixteen routes 908 retrieved by the route retrieval means 103 as shown in FIG. 9(c). Referring to FIG. 9(c), four routes are selected by connection of routes 909 and 908 for the suitable routes from the starting point 901 to the ,route store points 905 adjacent to the destination 904, for example.

Figure 9D:
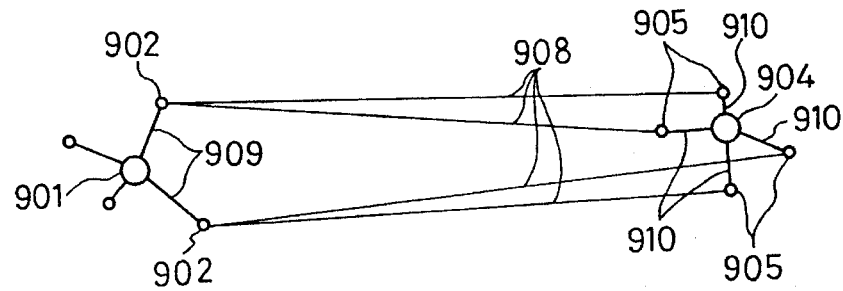

Finally, routes 910 from the destination 904 to the four route store points 905 are derived as shown in FIG. 9(d). Consequently, four routes from the starting point 901 to the destination 904 are decided as "starting point 901 → two route store points 902 → four route store points 905 → destination 904".

According to the fourth embodiment, since plural routes between the starting point and destination are derived and are shown to the operator, the operator can select an optimum route in compliance with his choice. In the above-mentioned operation, search in the neighborhood of the destination can be carried out before search in the neighborhood of the starting point. Moreover, routes from plural route store points adjacent to the starting point to the destination can be derived in advance, and thereafter plural routes from the starting point to the respective route store points adjacent to the starting point can be derived. If necessary, an optimum route can be selected from the plural routes decided in the fourth embodiment on the basis of an advantageous evaluation value such as a total travel time or a total distance between the starting point and destination.

[Fifth embodiment]

Figure 10:
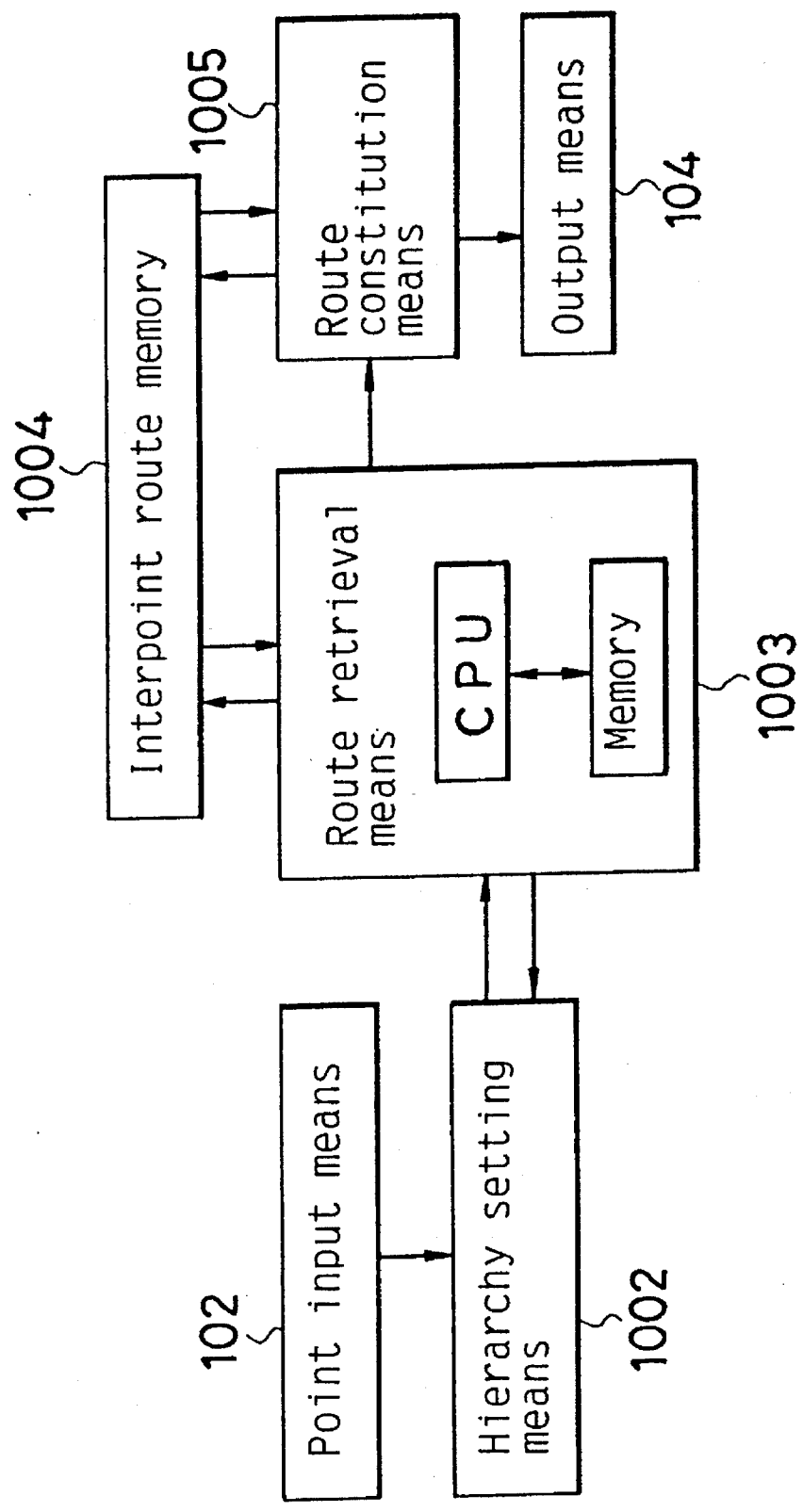
FIG. 10 is a block diagram of a fifth embodiment of the route selection apparatus in accordance with the present invention.

FIG. 10 is a block diagram of the route selection apparatus in the fifth embodiment. Referring to FIG. 10, the point input means 102 and output means 104 are identical with those of the first embodiment in configuration and function, and therefore the redundant descriptions thereon are omitted. In the fifth embodiment, a traffic network such as a road network is classified into plural hierarchies. For example, a major trunk line such as a highway is classified into an upper hierarchy and a minor branch line or a lane is classified into an lower hierarchy. The data of a point has a "hierarchy identifier" which indicates a hierarchy of the point on the traffic network. The data of the point having the hierarchy identifier and connection data between points are stored in the interpoint route memory 1004 shown in FIG. 10.

Figure 11:
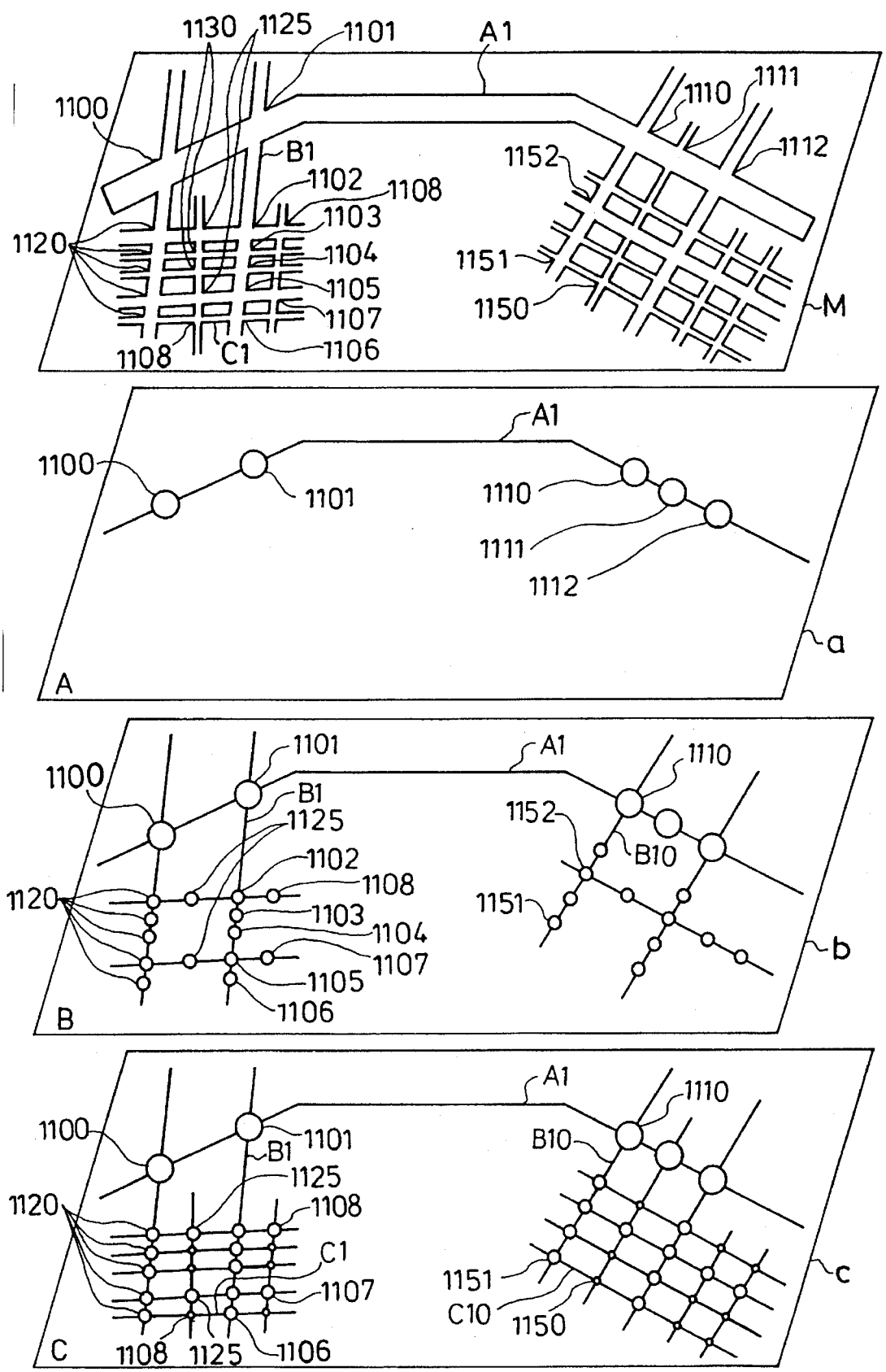
FIG. 11 is an example of a road map in the fifth embodiment.

FIG. 11 shows hierarchy maps "a", "b" and "c" on which points on the traffic network of a map M are classified into three hierarchies A, B and C, respectively. A criterion of classification is a width of a road at a point, for example. Three kinds of roads which are classified on the basis of the road width are shown on the map M shown in FIG. 11. The widest road A1 (hereinafter is referred to as trunk line) belongs to the hierarchy A as shown in the hierarchy map "a". Middle width roads B1 belong to the hierarchy B and lanes C1 belong to the hierarchy C. On the hierarchy maps "a", "b" and "c", the points 1100, 1101, 1110, 1111 and 1112 belong to the hierarchy A and are shown in the hierarchy map "a". The points 1120, 1125, 1151, 1152..., for example, belong to the hierarchy B, and the points of the hierarchies A and B are arranged on the hierarchy map "b". Point 1108 and 1150..., for example, belong to the hierarchy C and are arranged on the hierarchy map "c". Entire points of the map M are shown in the hierarchy map "c". An example of data stored in the interpoint route memory 1104 is shown in Table 5.

TABLE 5

| Reference point number | Hierarchy | Joining point | Route number |
|---|---|---|---|
| 1101 | A | 1110 | A1 |
| 1101 | B | 1102 | B1 |
| 1101 | B | 1103 | B2 |
| 1101 | B | 1104 | B3 |
| 1101 | B | 1105 | B4 |
| . | . | . | . |
| . | . | . | . |
| 1102 | B | 1104 | B100 |
| . | . | . | . |
| . | . | . | . |
| 1106 | B | 1101 | B200 |
| 1106 | B | 1102 | B201 |
| . | . | . | . |
| . | . | . | . |
| 1106 | C | 1107 | C1 |
| 1106 | C | 1108 | C2 |
| . | . | . | . |
| . | . | . | . |

Referring to Table 5, a "reference point number" represents a "reference point" on the map M. The reference point serves as a reference in retrieval operation of a route, and a point on the map M is used for the reference point when it Is necessary. The reference point is one point of the route store points. A "hierarchy" shows a hierarchy in which a reference point belongs. A "joining point" is a point to which a reference point having a reference point number Is connected. A "route number" represents a route between a reference point and a joining point. Arrangement of the data of the "reference point number", "hierarchy", "joining point" and "route number" can be made in various manners to realize high speed retrieval. For example the data can be arranged in the Table 5 in the order of the hierarchies or the reference point number. Moreover, in order to reduce the data, as mentioned in the second embodiment, at least one transit point on the way of a route can be stored.

An "object point" is one of the route store points and defined as a point which is similar to the reference point, The object point is located adjacent to a destination and serves as a point in retrieval operation by which a route is retrieved "from the destination to a starting point".

In the interpoint route memory 1004, entire routes among the points which belong to the respective hierarchies are not stored therein, for restrictive purpose of a data size, a predetermined number of routes (10–100, for example) located adjacent to a point are stored. The number of stored route is "ten" in the fifth embodiment, for example.

Detailed operation of the route selection apparatus in the fifth embodiment is elucidated with reference to FIG. 11 hereafter.

First, a starting point 1108 and a destination 1150 are designated in the map M shown In FIG. 11, for example. Second, a "reference point" to retrieve a route to the destination Is set on the starting point 1108, and an "object point" to retrieve a route to the starting point is set on the destination 1150. Namely, the starting point 1108 is temporarily used for the reference point and the destination 1150 is also used for the object point in an initial state. In general, the object point is located adjacent to the destination 1150 and a point is used for the object point when It is necessary. Subsequently, route retrieval operation is carried out on the lowest hierarchy C. In the embodiment, since the number of stored routes is restricted to ten, there is no occasion where a route connecting between the starting point 1108 and destination 1150 is retrieved by retrieving ten routes adjacent to the starting point 1108. In the above-mentioned case, therefore retrieval operation is tried on the next upper hierarchy B.

Prior to the retrieval on the next upper hierarchy a "new reference point" and a "new object point" have to be set on the hierarchy B. First, since the reference point on the starting point 1108 exists only on the hierarchy map "c", a point 1106 which exists on the next upper hierarchy B and is at the Immediately adjacent position to the starting point 1108 is selected for the "new reference point" on a route C1 including both the points 1108 and 1106. At this time, the route C1 between the old reference point (starting point 1108) and the new reference point 1106 is stored In the route retrieval means 1103. In a similar manner, since the object point on the destination 1150 exists only on the hierarchy map "c", a point 1151 which exists on the next upper hierarchy B and is at the Immediately adjacent position to the destination 1150 is selected for the new object point. At this time, the route C10 between the old object point (destination 1150) and the new object point 1151 is stored in the route retrieval means 1103. Consequently, since the new reference point 1106 and new object point 1151 are set on the hierarchy B, route retrieval operation is carried out on the hierarchy B. In the event that the data of a route connecting between the new reference point 1106 and new object point 1151 does not exist on the hierarchy B because of restriction of the number of stored routes, the retrieval operation must be tried on an upper hierarchy, hierarchy A.

For preparation of retrieval operation on the hierarchy A, a further new reference point and a further new object point are selected. A point 1101 which is at the immediately adjacent to the reference point 1106 on the hierarchy A is selected for the further new reference point, and a point 1110 which is at the immediately adjacent to the object point 1151 on the hierarchy A is selected for the further new object point. The new reference point 1101 and new reference point 1110 are set on the hierarchy A, and route retrieval operation is carried out on the hierarchy A. Consequently, a route A1 is retrieved between the new reference point 1101 and the new object point 1110. Thus, five routes of a first route C1 from the starting point 1108 to the reference point 1106 on the hierarchy B, a second route B1 from the reference point 1106 to the reference point 1101 on the hierarchy A, a third route A1 from the reference point 1101 to the object point 1110 on the hierarchy A, a fourth route B10 from the object point 1110 to the object point 1151 on the hierarchy B and a fifth route C10 from the object point 1151 to the destination 1150 on the hierarchy C are retrieved, and the route between the starting point 1108 and the destination 1150 is determined by connecting these five routes.

Figure 12:
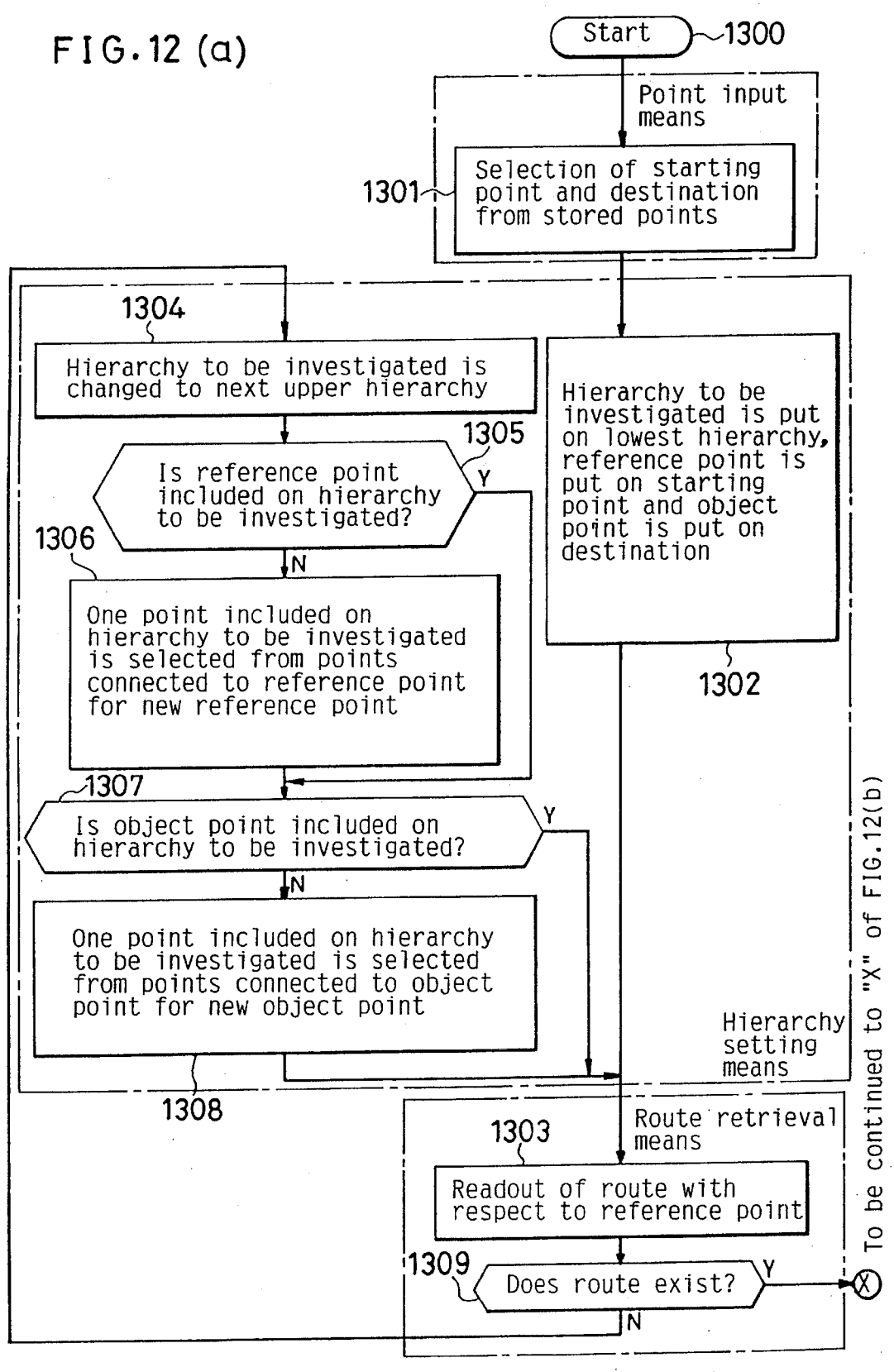
FIGS. 12(a) and 12(b) are flow charts of operation of the fifth embodiment.
Figure 12:
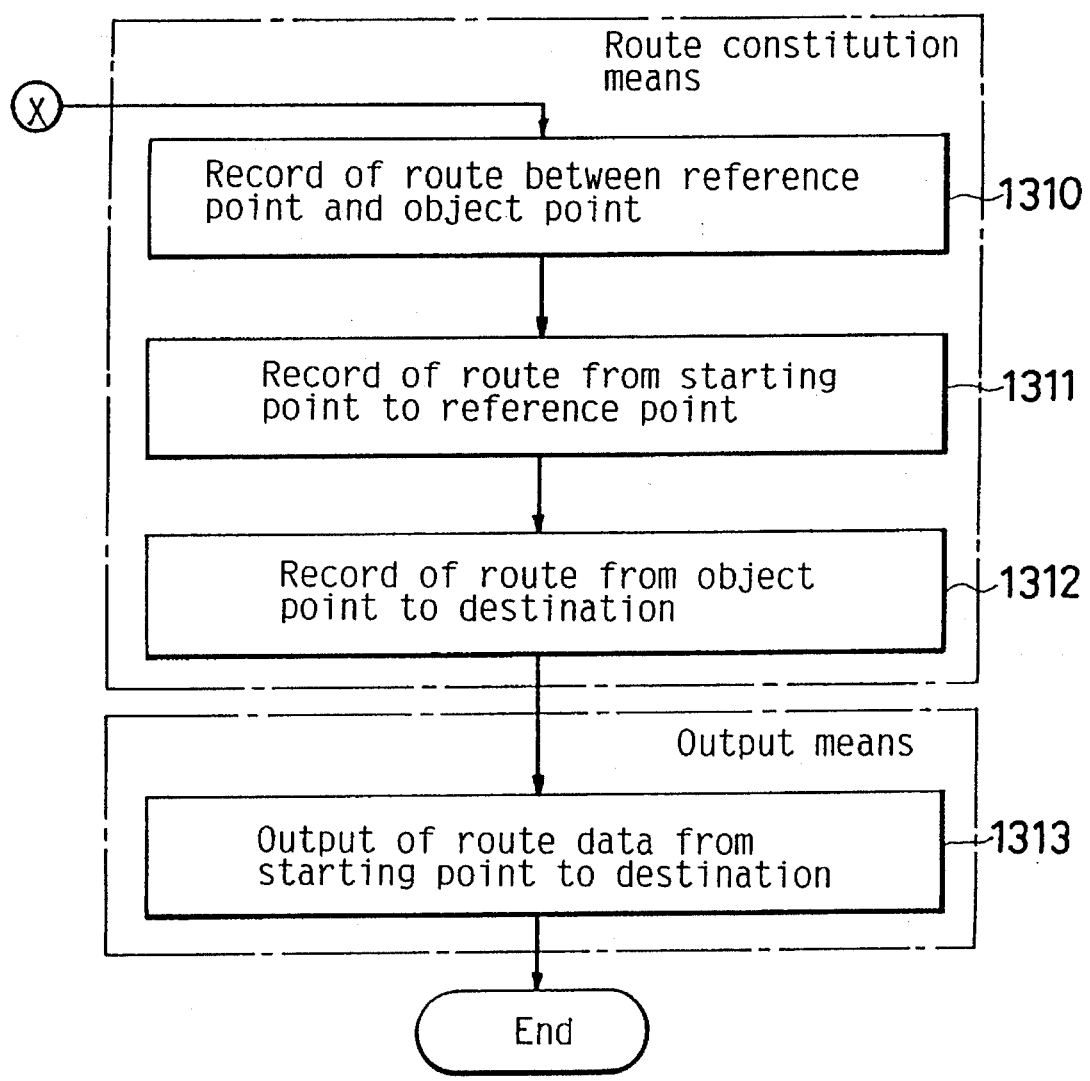

FIGS. 12(*a*) and 12(*b*) are flow charts of operation in the fifth embodiment. At step 1301, the starting point 1108 and destination 1150 are selected from the route store points stored In the Interpoint route memory 1004, and are designated with the point input means 102. Subsequently at step 1302, an Investigation hierarchy to be searched is set to the lowest hierarchy (hierarchy C in the embodiment), and the reference point is set to the starting point 1108, and the object point is see to the destination 1150. At step 1303, a route from the reference point to a connecting point from the reference point is retrieved in the hierarchy C, and the data of the route is read.

Subsequently, at decision step 1309 if there is a route between the reference point and the object point, the flow advances to step 1310, and the route number of the route is recorded. If there is no route therebetween, the flow advances to step 1304, and the investigation hierarchy is changed to the next higher hierarchy (hierarchy B). Then, at decision step 1305, if the reference point is not found on the hierarchy B, a point which is connected to the reference point (starting point) and exists on the hierarchy B is retrieved, and the point is set to the new reference point at step 1306. And the route from the starting point 1108 to the new reference point is stored. If the reference point (starting point 1108) exists on the hierarchy B, the flow advances from the step 1305 to step 1307. At decision step 1307, the object point (destination 1150) is searched in the investigation hierarchy B. If the object point (destination 1150) exists in the hierarchy B, the object point is maintained to be set on the destination 1150 as set in step 1302, and the flow advances to step 1303. If the object point (destination 1150) does not exist on the hierarchy B, the flow advances to step 1308 in a similar manner at step 1306. Then a polar which is connected to the object point (destination 1150) and exist on the investigation hierarchy (hierarchy B) is selected for a new object point, and the route from the destination 1150 to the new object point is stored.

After the new reference point and new object point are set on the hierarchy B, the flow advances to step 1303, and the data of a route between the new reference point and new object polar are read out. Then a route corresponding to combination of the new reference point and new object point is retrieved from the data on the hierarchy B shown in Table 5 at decision step 1309. When the route exists, the flow advances to step 1310 and the route is recorded. If the route does not exist, the flow advances to step 1304, and Investigation hierarchy is changed to the next higher hierarchy (hierarchy A).

Subsequently, in a similar manner to the operation on the hierarchy B, the flow advances to steps 1305, 1306, 1307 and 1308 in the named order, and further new reference polar (hereinafter is referred to as reference point on hierarchy A) and further new object point (hereinafter is referred to as object point on hierarchy A) are set on the hierarchy A.

Then a route between the reference point on the hierarchy A and the object point on the hierarchy A is retrieved on the hierarchy A at steps 1303 and 1309. Since the hierarchy A is of the highest hierarchy, a route between the reference point on the hierarchy A and the object point on the hierarchy A is derived without fall. The derived route (route number) is recorded at step 1310.

Subsequently, at step 1311, the route from the starting point 1108 to the reference point on the hierarchy A is recorded, and at step 1312, the route from the destination 1150 to the object point on the hierarchy A is also recorded. Finally, at step 1313, the routes C1. B1 from the starting point 1108 to the reference point on the hierarchy A, the route A1 from the reference point on the hierarchy A to the object point on the hierarchy A and the routes B10, C10 from the object point on the hierarchy A to the destination 1150 are connected to one route in the named order, and the route between the starting point and destination is output.

According to the fifth embodiment, retrieval speed is greatly increased, since the data of the routes are stored in the respective hierarchies on the basis of the hierarchy identifier attached to the point, and retrieval of a route is carried out on each hierarchy. Moreover, since the number of stored route with respect to each point is restricted to a predetermined number (ten in the example elucidated above), It is not necessary to store a lot of data in the interpoint route memory 1004, and thus memory capacity thereof can be reduced.

In the above-mentioned example, plural reference points or plural object points can be set on every hierarchies. In such case route retrieval operation can be carried out among the plural reference points and the plural object points In a similar manner described In the fourth embodiment.

In the fifth embodiment, the number of hierarchy is not limited to three hierarchies. The criterion in classification or the hierarchy may be road condition to drive, a gradient of the road, a toll of road, number of pedestrian on the road side, architectures located along the road (residence area, an industrial area, or a busy shopping area). It is recommendable that a preferable number of hierarchy may be set in correspondence to the road condition in advance, and route retrieval is carried out on a network having the number of hierarchies corresponding to a selected starting point and a destination.

A range of a hierarchy is decided corresponding to a capacity of a memory medium such as a CD-ROM, and a hierarchy having the most detailed data is preferably located on the lowest hierarchy.

[Sixth embodiment]

Figure 13:
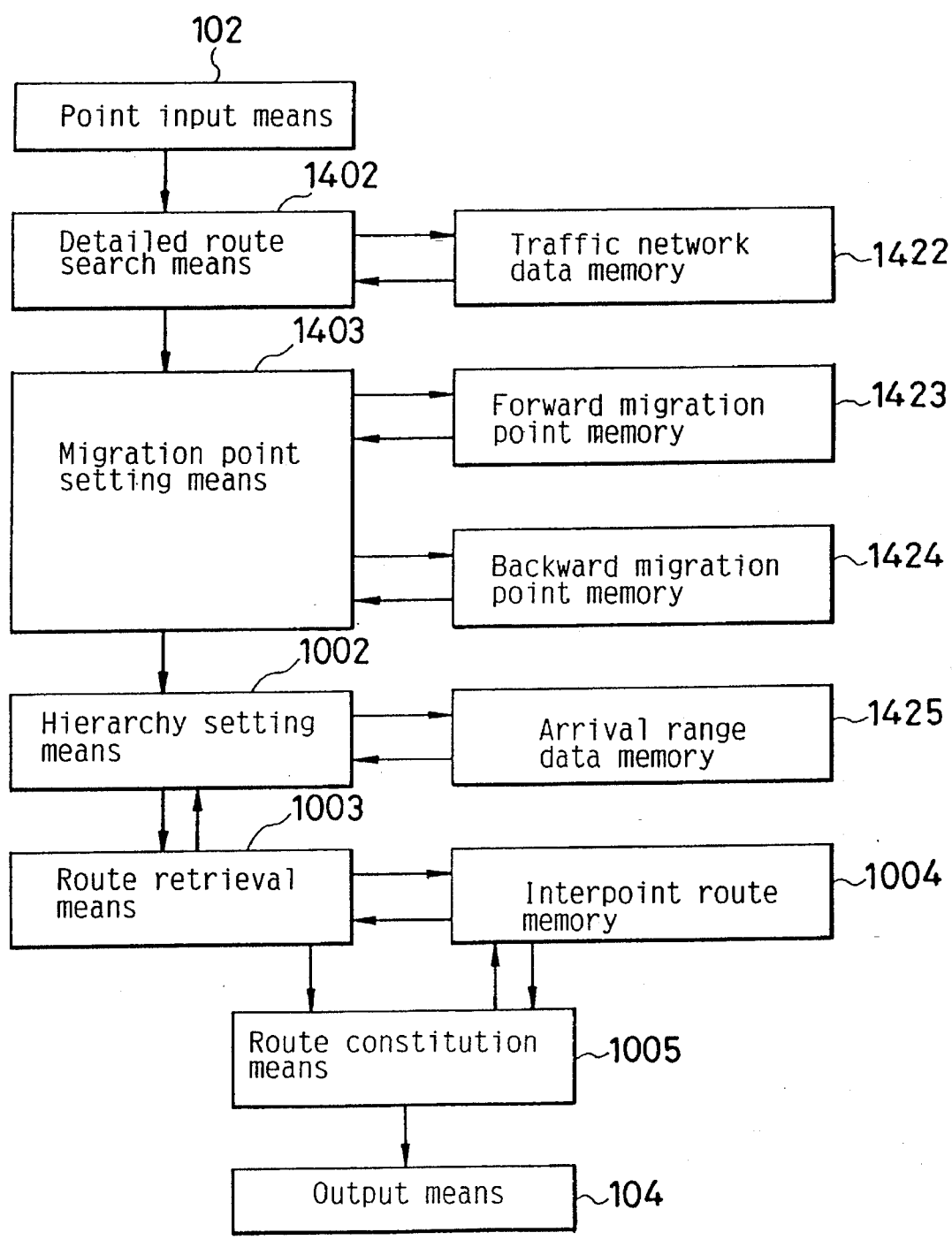
FIG. 13 is a block diagram of a sixth embodiment of the route selection apparatus In accordance with the present invention.

FIG. 13 is a block diagram of the route selection apparatus in the sixth embodiment. Referring to FIG. 13, the point input means 102, hierarchy setting means 1002, route retrieval means 1003, interpoint route memory 1004, route constitution means 1005 and output means 104 are identical with those of FIG. 10 in configuration and function, and therefore redundant descriptions thereon are omitted. In the sixth embodiment, points and routes on a road network are made to form a hierarchy structure in a similar manner in the fifth embodiment. In each hierarchy, the number of stored route with respect to a point is restricted to a predetermined number.

Search of a route on a lowest hierarchy having the most detailed information of road data is carried out in a detailed route search means 1402. Detailed road network data which is searched with the detailed route search means 1402 is stored in a map data memory 1422. Data of a residential district map and a detailed road map may be stored In advance in the map data memory 1422. Furthermore, a road network may be stored in the map data memory 1422 during driving a vehicle.

A "migration point" is a point on a road network, and a route is connected from a point on a hierarchy to a point on other hierarchy through the migration point. The migration polar is set In a migration point setting means 1403. The migration polar comprises a "forward migration point" and a "backward migration point". The forward migration point is a migration polar on a route getting toward a destination from a starting point, and the backward migration point is a migration point on a route getting toward the starting point from the destination. A predetermined number of points are stored in a forward migration point memory 1423, through which a route migrates from a reference point on a hierarchy to other hierarchy in the direction toward the destination from the starting point. In a similar manner, a predetermined number of points are stored in a backward migration point memory 1424, through which a route migrates from an object point on a hierarchy to other hierarchy in the direction toward the starting point from the destination. An example of data structure of the migration points is shown in Table 6.

TABLE 6

Data structure of migration points

| Point number | Hierarchy | Hierarchy to which migration is allowed | Migration points (four and below) |
|---|---|---|---|
| 1107 | C | B | 1105, 1106, 1104, 1103 |
| 1107 | C | A | 1101, |
| 1105 | B | A | 1101, |

Referring to Table 6, a "point number" is attached to a point positioned on a "hierarchy" listed on the same row as the point number, and a route for connecting the point is permitted to migrate to a hierarchy listed in a box as "hierarchy to which migration is allowed". "Migration point" such as 110S, 1106, 1104 and 1103 of a predetermined number (four points at most in the embodiment) are stored with respect to a point having the point number of 1107, and the route is permitted to migrate from a hierarchy to other hierarchy only through the migration points. Even if the number of migration point is much more than four, four migration points which are located adjacent to the point are selected in the order of shorter distance. These selected migration points are stored in the forward migration point memory 1423 or the backward migration point memory 1424 in advance.

Figure 15:
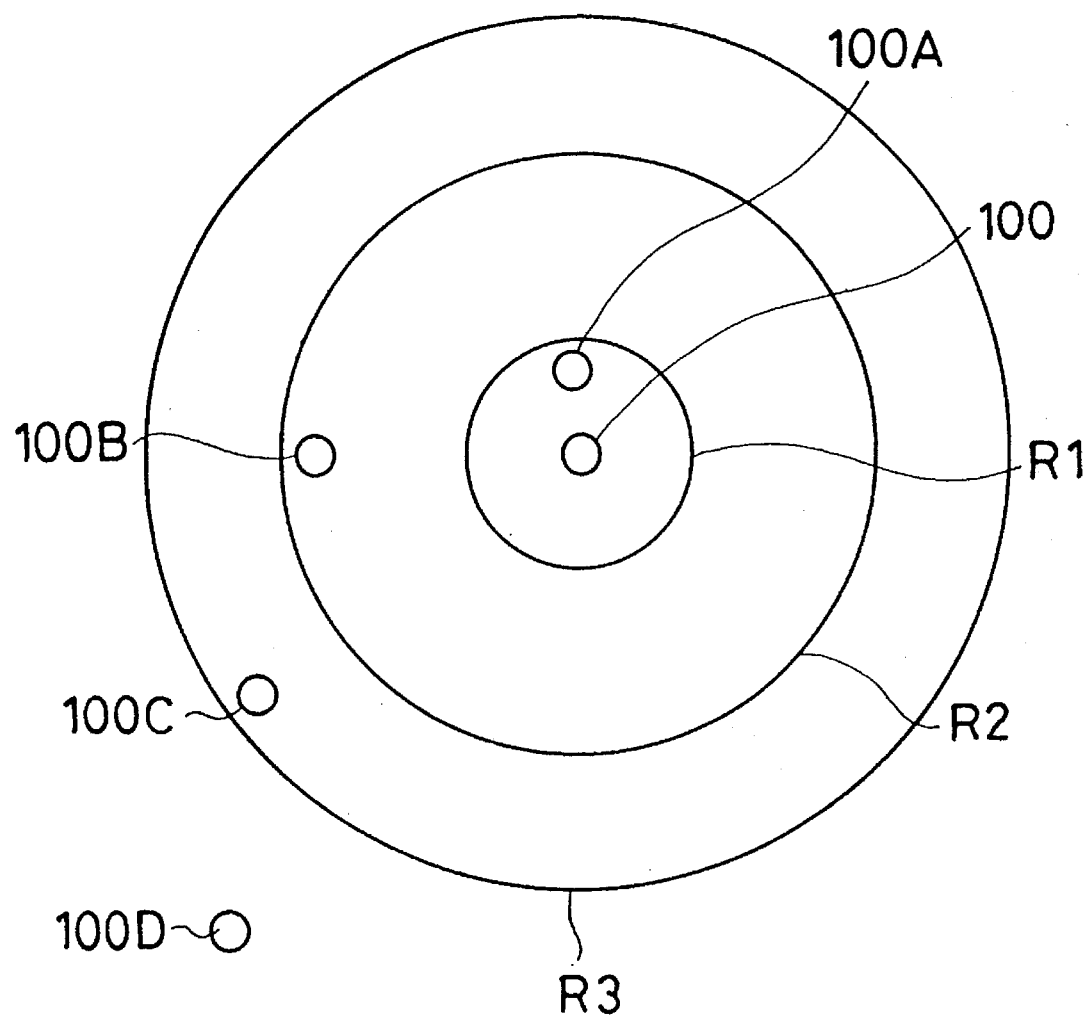
FIG. 15 is a diagram of an example of arrival ranges in the sixth embodiment.

In an arrival range data memory 1425, data of an "arrival range" of a route is stored. The arrival range is defined by a distance in which a point has routes to other points on the same hierarchy. In other words, the route is permitted to arrive from the point to other point within the arrival range on the same hierarchy. An example of the arrival range is shown in FIG. 15. Referring to FIG. 15, a circle R1 shows a first arrival range on the lowest hierarchy including a starting point 100 and a migration point 100A. Circles R2 and R3 show a second arrival range and a third arrival range on upper hierarchies, respectively. Migration points 100B and 100C are included within the respective arrival ranges shown by the circles R2 and R3. Outward of the circle R3 shows an arrival range on the highest hierarchy. In general, the higher the hierarchy becomes, the wider the arrival range becomes.

Figure 14A:
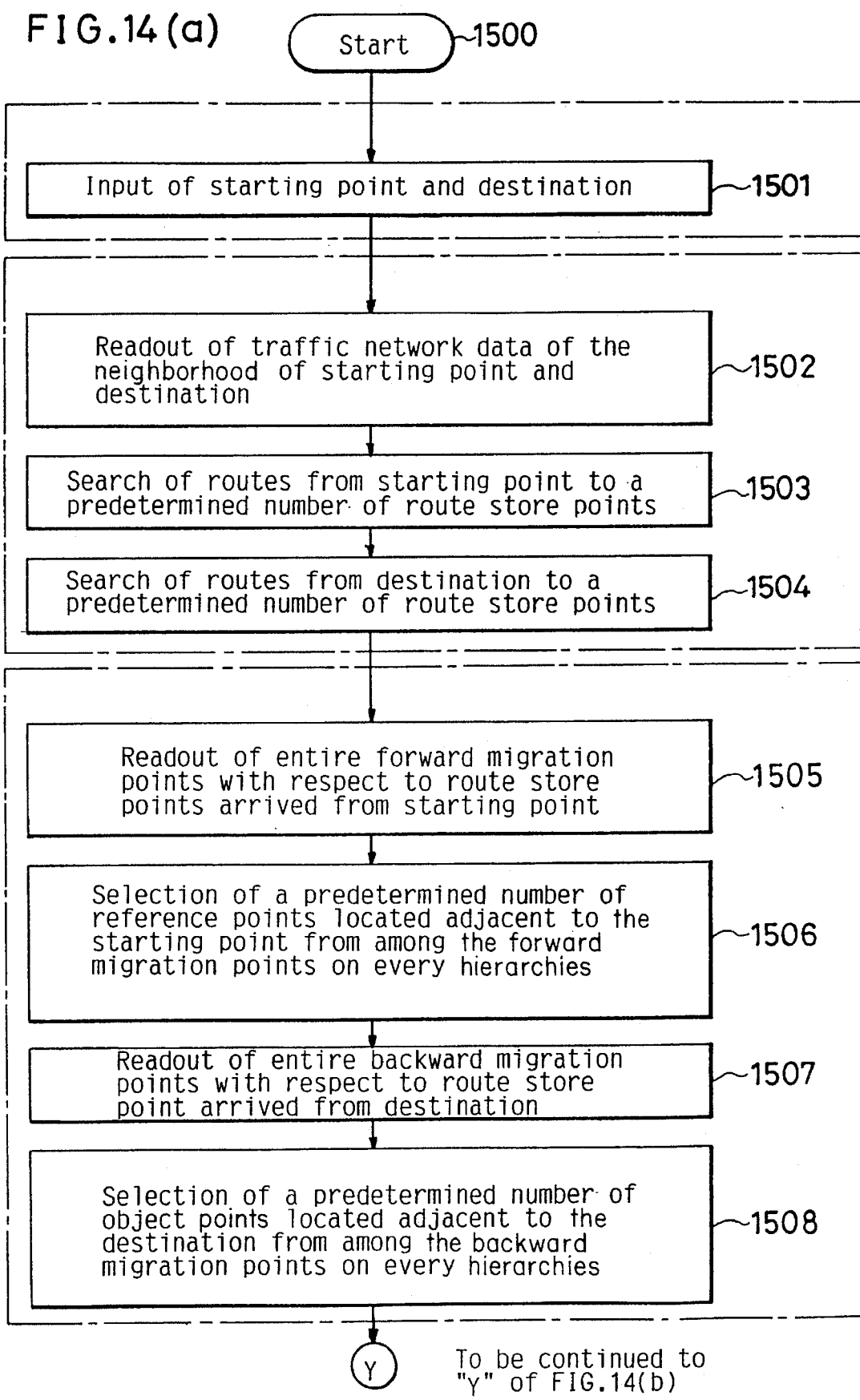
Figure 14C:
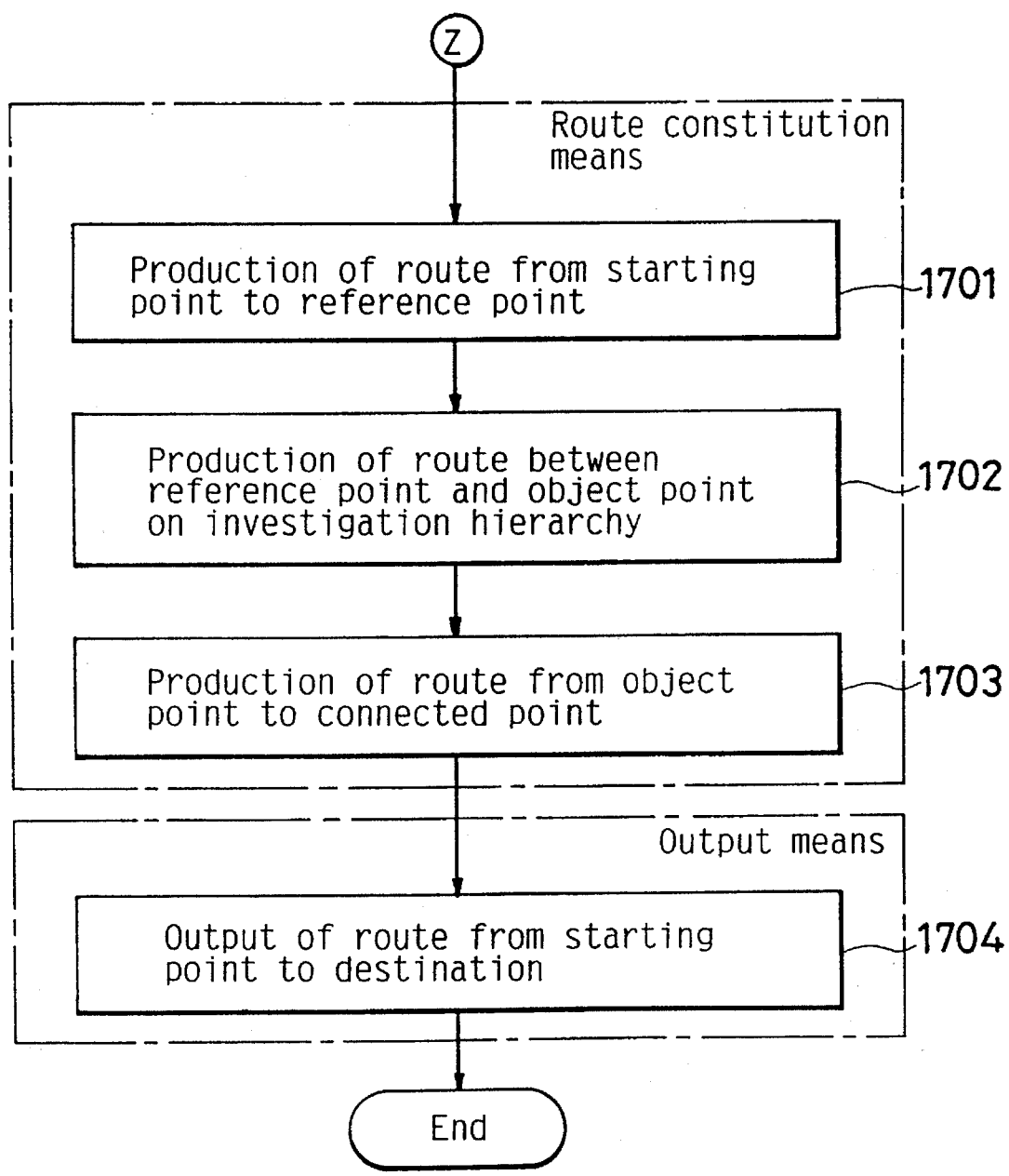

Operation of the route selection apparatus in the sixth embodiment is elucidated with reference to flow charts shown in FIGS. 14(a), 14(b) and 14(c). First, a starting point and a destination are inputted at step 501. Second, traffic network data is read out from the traffic network data memory 1422 at step 1502. Then, at step 1508, plural routes from the starting point to route store points stored in the interpoint route memory 1004 are searched with the detailed route search means 1402. At step 1504, plural routes from the destination to route stored points stored in the interpoint route memory 1004 are also searched with the detailed route search means 402. At step 1505. entire forward migration points with respect to the route store points searched at step 1503 are read out from the forward migration point memory 1423, and reference points located adjacent to the starting point are selected to retrieve routes from the starting point by using the forward migration points. In selection of the reference points located adjacent to the starting point, a predetermined number of the reference point are selected from every hierarchies.

At step 1507, entire backward migration points to derive an object point which is used to retrieve a route from the destination are read out from the backward migration point memory 1424. Subsequently, at step 1508, a predetermined number of object point located adjacent to the destination are selected from the backward migration points read out at step 1507 on every hierarchies. As mentioned above, after the predetermined number of reference points and object points are decided on the respective hierarchies, the investigation hierarchy for investigating a route is set to the lowest hierarchy at step 1601. Then the flow advances to decision step 1602 where it is determined if an object point exists in the arrival range of a reference point in the investigation hierarchy. If it is, the flow advances to seep 1603 an object point does not exist in the arrival range, the flow advances to step 1604, and the hierarchy to be investigated is changed to the next upper hierarchy and the flow returns to step 1602.

In the sixth embodiment, migration of a route from a hierarchy to other hierarchy is carried out via a migration point. A migration point on each hierarchy is read out from the forward migration point memory 1424 with respect to the predetermined number of stored points (reference point) which are searched with respect to a starting point. In a similar manner, a migration point on each hierarchy is read out from the backward migration point memory 1424 with respect to the predetermined number of stored points (object point) which are searched with respect to the destination. In the event that the object point is included in the arrival range of the reference point, entire routes connected to each reference point on the investigation hierarchy are read out at step 1603.

Subsequently, at decision step 1605, It is examined whether the object point is included in the connecting points of a route on the investigation hierarchy. If the object point is included in the connecting points, the flow advances to step 1606; and if it is not, the flow advances to step 1606; and if step 1606, a sum of evaluation values is examined. The evaluation value is a value representing a characteristic of a route between the starting point and destination. Examples of the evaluation value are "average traveling time", 'distance" and "traffic congestion" or the like. When the traveling time is employed as the evaluation value, the sum of traveling times of plural routes connecting between the starting point and destination becomes the sum of the evaluation values. In the case that plural routes exist between the starting point and destination, the respective evaluation values of the routes are compared with each other, and the route having the smallest evaluation value is selected for an optimum route. When the route having the minimum evaluation value has been determined, the flow advances to step 1607, and the data of the Investigation hierarchy, reference point and object point are stored. Then at decision step 1608, it is examined whether entire reference points on the investigation hierarchy are investigated. When the investigation with respect to entire reference points has been completed, the flow advances to step 1609, and it is examined whether an object point is included in the reference points. If the object point is included in the reference points, the flow advances to step 1701, and a route from the starting point and to the reference point is produced. On the contrary, if the object point is not included in the reference points at step 1609, the flow returns to step 1604, and the investigation hierarchy is changed to the next upper hierarchy. Then operation from step 1602 to step 1609 is repeated.

Subsequently, at step 1702, a route between the reference point and object point is produced on the investigation hierarchy. Finally, at step 1703, a route from the object point and the destination Is produced by searching the route stored at step 1607. Consequently, the route from the starting point to destination is produced and Is output to the output means at step 1704.

According to the sixth embodiment, since a migration point is decided in the forward migration point memory 1423 and backward migration point memory 1424 in advance, when a route changes from a hierarchy to other hierarchy, the route can migrate between both the hierarchies via the migration point. The migration operation is carried out not only between neighboring two hierarchies but also between two hierarchies which are separated with each other. Consequently, it is not necessary to change an Investigation hierarchy from a lower hierarchy to an upper hierarchy step by step as shown in fifth embodiment. Thus, a retrieval speed of a route is further improved.

Moreover, the arrival range of connecting points stored with respect to each point on each hierarchies is stored in the arrival range data memory 1425. Therefore, efficient retrieval is carried out by investigating the object point on the basis of the arrival range, and hence the retrieval speed is further improved.

In the sixth embodiment, the range stored in the arrival range data memory 1425 is represented by a circle which has a center of the reference point P as shown in FIG. 15, but the shape of the arrival range is not limited to the circle. Furthermore, for example, the arrival range may be determined by the number of connecting point with respect to a reference point. The numbers of the reference point and object point, in the sixth embodiment, is one or more. Since the migration point is classified Lo the forward migration point and backward migration point and is stored in the respective memories, the classification can correspond to the road of one-way traffic. If the one-way traffic is not considered, the classification to the forward migration point and backward migration point is not needed. In a search operation of a route from the destination to the starting point in view of the one-way traffic, the road of one-way traffic can be passed to reverse direction by attaching a suitable identifier to the data of a point representing the one way traffic.

In the sixth embodiment, when a detailed search of a lane is not needed, the detailed route search means 1402 and the road network memory 1422 can be omitted.

The entire embodiments 1–6 as mentioned above will be able to accommodate to a railway network. In the railway network, an optimum route is derived on the basis of connection relation between stations, the minimum travel time or train fair.

Although the present Invention has been described in terms of the presently preferred embodiments, It is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the Invention.

What is claimed is:

1. A route selection method comprising the steps of:

defining, in advance, a connection network that includes a plurality of points representing points on a map between which a person may travel;

storing, in advance in a memory, various combinations of pairs of said points, wherein each pair of points includes a first point representing an arbitrary starting point on said map, a second point representing an arbitrary destination point on said map, and at least one transit point, if said transit point exists, said transit point corresponding to one of said plurality of points in said connection network that is located between said first point and said second point in that pair of points and through which a person must travel in progressing from said first point to said second point in that pair of points;

selecting any two points from said plurality of points in said connection network;

searching said memory for a first pair of points corresponding to said selected two points and retrieving a first transit point associated with said first pair of points if said first transit point exists;

searching said memory repeatedly for additional pairs of points stored therein and retrieving transit points associated with each additional pair of points retrieved, wherein a first point in each of said additional pairs of points corresponds to one of said selected two points and a second point in each of said additional pairs of points corresponds to a transit point retrieved in a preceding searching operation, if present, until a pair of points having no transit point associated therewith is located; and determining a route between said two selected points by combining said two selected points with all of said transit points retrieved during said searching and retrieving operations.

2. A route selection method comprising the steps of:

defining, in advance, a connection network that includes a plurality of points representing points on a map between which a person may travel, said plurality of points being subdivided into a plurality minor points and a plurality route store points;

storing, in advance in a route store memory, various combinations of pairs of said route store points, and storing at least one transit point associated with each pair of said route store points, if said transit point exists, wherein said transit point associated with a pair of route store points corresponds to one of said plurality of points in said connection network that is located between a first route store point and a second route store point in that pair of route store points through which a person must travel in progressing from said first route store point to said second route store point in that pair of route store points;

selecting any two points from said plurality of points in said connection network, wherein one of said selected two point corresponds to a starting point and another of said selected two points corresponds to a destination point to which a user desires to travel;

determining if said selected two points corresponds to any of said route store points stored in said route store memory;

retrieving from said route store memory a first route store point proximate to said starting point, and determining a first route from said starting point to said first route store point if said starting point does not correspond to any of said route store points;

retrieving from said route store memory a second route store point proximate to said destination point, and determining a second route from said destination point to said second route store point if said destination point does not correspond to any of said route store points;

searching said route store memory for a first pair of route store points corresponding to said first and said second route store points and retrieving a first transit point associated with said first pair of points, if said first transit point exists;

searching said route store memory repeatedly for additional pairs of route stores points stored therein and retrieving a transit point associated with each additional pair of route store points retrieved, wherein a first route store point in each of said additional pairs of route store points corresponds to one of said first and said second route store points and a second route store point in each of said additional pairs of route store points corresponds a transit point retrieved in a preceding searching operation, if present, until a pair of route store points having no transit point associated therewith is located;

determining a searched route between said first and said second route store points by combining said first and said second route store points with all of said transit points retrieved during said searching and retrieving operations; and determining a complete route between said starting point and said destination point by combining said first route, said second route and said searched route.

3. A route selection method comprising the steps of:

defining, in advance, a connection network that includes a plurality of points representing points on a map between which a person may travel, said plurality of points being subdivided into a plurality minor points and a plurality route store points;

storing, in advance in a route store memory, various combinations of pairs of said route store points, and storing at least one transit point associated with each pair of route store points, if said transit point exists, wherein said transit point associated with a pair of route store points corresponds to one of said plurality of points in said connection network that is located between a first route store point and a second route store point in that pair of route store points through which a person must travel in progressing from said first route store point to said second route store point in that pair of route store points;

selecting any two points from said plurality of points in said connection network, wherein one of said selected two points corresponds to a starting point and another of said selected two points corresponds to a destination point to which a user desires to travel;

determining if either of said selected two points corresponds to any one of said route store points;

retrieving from said route store memory a plurality of first route store points proximate to said starting point, and determining a plurality of first routes from said starting point to said plurality of first route store points, if said starting point does not correspond to any one of said route store points;

retrieving from said route store memory a plurality of second route store points proximate to said destination point, and determining a plurality of second routes from said destination point to said plurality of second route store points if said destination point does not correspond to any of said route store points;

conducting searching operations of said route store memory to determine a plurality of complete routes between said starting point and said destination point, each searching operation including the steps of:

searching said route store memory for a pair of route store points that includes a first route store point from said plurality of first route store points and a second route store point from said plurality of second route store points and retrieving a transit point associated with said pair of route store points, if said transit point exists;

searching said route store memory repeatedly for additional pairs of route stores points stored therein and retrieving transit points associated therewith, wherein a first route store point in said additional pairs of route store points corresponds to one of said first route store point and said second route store point and a second route store point in said additional pairs of route store points corresponds a transit point retrieved in a preceding searching operation, if present, said repeated searching continuing until a pair of route store points having no transit point associated therewith is located;

determining a searched route between said first and said second route store points by combining said first and said second route store points with all of said transit points retrieved during said searching and retrieving operations; and determining a complete route between said starting point and said destination point by combining said first route, said second route and said searched route associated with one another.

4. A route selection method as defined in claim 3, further comprising the steps of:

selecting a predetermined number of said plurality of complete routes between said starting point and said destination point; and outputting said predetermined number of selected routes.

5. A route selection method comprising the steps of:

(a) defining, in advance, a connection network having a hierarchy structure and a plurality of points representing points on a map between which a person may travel, wherein said hierarchy structure includes a plurality of hierarchies from a lowest hierarchy to a highest hierarchy and said plurality of points are associated with at least one of said plurality of hierarchies, and wherein for each hierarchy there exists a plurality of transition points representing a connection points between hierarchies;

(b) storing, in a route memory in advance, data representing said plurality of points and data representing a predetermined number of complete routes between a predetermined number points located in a same hierarchy;

(c) selecting two points from said plurality of points in said connection network and stored in said route memory, said two points corresponding to a starting point and a destination point;

(d) defining a first reference point as said starting point and a first object point as said destination point;

(e) conducting a first searching operation of said route memory for a complete route in a first hierarchy between said first reference point and said first object point;

(f) changing a hierarchy in which a route is searched for to a hierarchy above said first hierarchy if no complete route is found during said searching operation of said first hierarchy;

(g) retrieving a first transition point located in said first hierarchy proximate to said first reference point and retrieving a first complete route between said first reference point and said first transition point, if said first reference point is not one of said plurality of transition points between said first hierarchy and said hierarchy above said first hierarchy;

(h) retrieving a second transition point located in said first hierarchy proximate to said first object point and retrieving a second complete route between said first object point and said second transition point, if said first object point is not one of said plurality of transition points between said first hierarchy and said hierarchy above said first hierarchy;

(i) conducting a second searching operation of said route memory for a complete route in said hierarchy above said first hierarchy between said first transition point and said second transition point;

(j) repeating steps (f)–(i) until a complete route is found, wherein each time steps (f)–(i) are carried out, said first hierarchy in which a route is searched for is incremented to a next higher hierarchy, said first transition point becomes said first reference point and said second transition point becomes said first object point; and (k) determining a final complete route between said starting point and said destination point by combining all of said first routes, all of said second routes and said complete route.

6. A route selection method comprising the steps of:

(a) defining, in advance, a connection network having a hierarchy structure and a plurality of points representing points on a map between which a person may travel, wherein said hierarchy structure includes a plurality of hierarchies from a lowest hierarchy to a highest hierarchy and said plurality of points are associated with at least one of said plurality of hierarchies, and wherein for each hierarchy there exists a plurality of migration points representing connection points between hierarchies;

(b) storing, in a memory in advance, data representing said plurality of points, data representing said migration points, data representing distance ranges associated with each of said migration points, and data representing a predetermined number of complete routes between points located in a same hierarchy, said points located in said same hierarchy including said points associated with that hierarchy and migration points associated with that hierarchy;

(c) selecting two points from said plurality of points in said connection network stored in said memory, said two points corresponding to a starting point and a destination point;

(d) retrieving a first group of said migration points associated with said starting point, said first group of migration points including migration points associated with each hierarchy in said plurality of hierarchies, a first group of routes from said starting point to said first group of migration points, a second group of migration points associated with said destination point, said second group of migration points including migration points associated with each hierarchy in said plurality of hierarchies, and a second group of routes from said destination point to said second group of migration point;

(e) determining whether any of said second group of migration points in a first hierarchy are within said distance ranges associated with said first group of migration points in said first hierarchy, and if not, repeating said determining step with respect to a next higher hierarchy until it is determined that at least one migration point from said second group of migration points is within a distance range of at least one migration point from said first group of migration points and retrieving all routes associated with said at least one migration point from said first group of migration points;

(f) determining whether said at least one migration point from said second group of migration points is included in any one of said routes associated with said at least one migration point from said first group of migration points; and (g) obtaining a complete route from said starting point to said destination point if at least one migration point from said second group of migration points is included in any one of said routes associated with said at least one migration point from said first group of migration points, said complete route being obtained by connecting a first route from said starting point to said at least of one migration point from said first group of migration points, a second route from said destination point to said at least of one migration point from said second group of migration points, and a third route that includes said at least one migration point from said first group of migration points and said at least one migration point from said second group of migration points determined in step (f).

7. A route selection method according to claim 6, further comprising the step of repeating steps (e)–(g) using a still higher hierarchy in said determining operation of step (e), if at least one migration point from said second group of migration points is not included in any one of said routes associated with said at least one migration point from said first group of migration points.

8. A route selection method according to claim 6, wherein, if a plurality of routes exist after completing steps (e) and (f), determining which of said plurality of route to use in said obtaining step based on characteristic data associated with said routes.

9. A route selection method according to claim 8, wherein said characteristic data includes at least one of distance data, travel time, and traffic congestion.

10. A route selection apparatus that establishes a complete route between two points on a connection network that includes a plurality of points representing points on a map between which a person may travel, said apparatus comprising:

memory means for storing various combinations of pairs of said points in a memory, wherein a first point in each pair of points represents an arbitrary starting point on said map and a second point in each pair of points represents an arbitrary destination point on said map, and, storing only one transit point associated with each pair of points, if said transit point exists, said transit point associated with a pair of said points corresponds to one of said plurality of points in said connection network that is located between said first point and said second point that pair of points and through which a person must travel in progressing from said first point to said second point in that pair of points;

input means for selecting any two points from said plurality of points in said connection network;

means for searching said memory for a first pair of points corresponding to said selected two points and retrieving a first transit point associated with said first pair of points if said first transit point exists;

means for repeatedly searching said memory for additional pairs of points stored therein and retrieving transit points associated with each additional pair of points retrieved, wherein a first point in said additional pairs of points corresponds to one of said selected two points and a second point in said additional pairs of points corresponds to a transit point retrieved in a preceding searching operation, if present, until a pair of points having no transit point associated therewith is located; and means for determining said complete route between said two selected points by combining said two selected points with all of said transit points retrieved during said searching and retrieving operations.

11. A route selection apparatus that establishes a complete route between two points on a connection network that includes a plurality of points representing points on a map between which a person may travel, said plurality of points being subdivided into a plurality minor points and a plurality route store points, said apparatus comprising:

route store memory means for storing various combinations of pairs of said route store points, and storing at least one transit point associated with each pair of said route store points, if said transit point exists, wherein said transit point associated with a pair of said route store points corresponds to one of said plurality of points in said connection network that is located between a first route store point and a second route store point in that pair of route store points through which a person must travel in progressing from said first route store point to said second route store point in that pair of route store points;

input means for selecting any two points from said plurality of points in said connection network, wherein one of said selected two points corresponds to a starting point and another of said selected two points corresponds to a destination point to which a user desires to travel;

means for determining if either of said selected two points corresponds to any of said route store points stored in said route store memory;

means for retrieving from said route store memory a first route store point proximate to said starting point and for determining a first route from said starting point to said first route store point if said starting point does not correspond to any of said route store points;

means for retrieving from said route store memory a second route store point proximate to said destination point and for determining a second route from said destination point to said second route store point if said destination point does not correspond to any of said route store points;

means for searching said memory for a first pair of route store points corresponding to said first and said second route store points and retrieving a first transit point associated with said first pair of points, if said first transit point exists;

means for repeatedly searching said memory for additional pairs of route stores points stored therein and retrieving a transit point associated with each additional pair of route store points retrieved, wherein a first route store point in said additional pairs of route store points corresponds to one of said first and said second route store points and a second route store point in said additional pairs of route store points corresponds a transit point retrieved in a preceding searching operation, if present, said repeated searching continuing until a pair of route store points having no transit point associated therewith is located;

means for obtaining a searched route between said first and said second route store points by combining said first and said second route store points with all of said transit points retrieved during said searching and retrieving operations; and means for obtaining said complete route between said starting point and said destination point by combining said first route, said second route and said searched route.

12. A route selection apparatus for establishing a route between two points in a connection network that includes a plurality of points representing points on a map between which a person may travel, said plurality of points being subdivided into a plurality minor points and a plurality route store points, said apparatus comprising:

route store memory for storing various combinations of pairs of said route store points, and storing at least one transit point associated with each pair of route store points, if said transit point exists, wherein said transit point associated with a pair of said route store points corresponds to one of said plurality of points in said connection network that is located between a first route store point and a second route store point in that pair of route store points through which a person must travel in progressing from said first route store point to said second route store points that pair of route store points;

input means for selecting any two points from said plurality of points in said connection network, wherein one of said selected two points corresponds to a starting point and another of said selected two points corresponds to a destination point to which a user desires to travel;

means for determining if either of said selected two points corresponds to any one of said route store points;

means for retrieving from said route store memory a plurality of first route store points proximate to said starting point and for determining a plurality of first routes from said starting point to said plurality of first route store points, if said starting point does not correspond to any one of said route store points;

means for retrieving from said route store memory a plurality of second route store points proximate to said destination point and for determining a plurality of second routes from said destination point to said plurality of second route store points if said destination point does not correspond to any of said route store points;

wherein searching operations of said route store memory are conducted to determine a plurality of complete routes between said starting point and said destination point, said searching operations being conducted by:

means for searching said route store memory for a pair of route store points that includes a first route store point from said plurality of first route store points and a second route store point from said plurality of second route store points and retrieving a transit point associated with said pair of route store points, if said transit point exists;

means for repeatedly searching said route store memory for additional pairs of route stores points stored therein and retrieving a transit point associated with each additional pair of route store points retrieved, wherein a first route store point in said additional pairs of route store points corresponds to one of said first route store point and said second route store point and a second route store point in said additional pairs of route store points corresponds a transit point retrieved in a preceding searching operation, if present, and wherein said means for repeatedly searching continues said repeated searching operation until a pair of route store points having no transit point associated therewith is located;

means for obtaining a searched route between said first and said second route store points by combining said first and said second route store points with all of said transit points retrieved during said searching and retrieving operations; and means for obtaining a complete route between said starting point and said destination point by combining said first route, said second route and said searched route associated with one another.

13. A route selection apparatus as defined in claim 12, further comprising:

means for selecting a predetermined number of said plurality of complete routes between said starting point and said destination point; and means for outputting said predetermined number of selected routes.

14. A route selection apparatus for obtaining a complete route between two points on a connection network having a hierarchy structure and a plurality of points representing points on a map between which a person may travel, wherein said hierarchy structure includes a plurality of hierarchies from a lowest hierarchy to a highest hierarchy and said plurality of points are associated with at least one of said plurality of hierarchies, and wherein for each hierarchy there exists a plurality of transition points representing a connection points between hierarchies, said apparatus comprising:

route memory for storing data representing said plurality of points and data representing a predetermined number of complete routes between a predetermined number of points located in a same hierarchy;

input means for selecting two points from said plurality of points in said connection network and stored in said route memory, said two points corresponding to a starting point and a destination point;

means for defining a first reference point as said starting point and a first object point as said destination point;

first searching means for conducting a first searching operation of said route memory for a complete route in a first hierarchy between said first reference point and said first object point;

changing means for changing a hierarchy in which a route is searched for to a hierarchy above said first hierarchy if no complete route is found during said searching operation of said first hierarchy;

retrieving means for retrieving from said route memory a first transition point located in said first hierarchy proximate to said first reference point and retrieving a first complete route between said first reference point and said first transition point, if said first reference point is not one of said plurality of transition points between said first hierarchy and said hierarchy above said first hierarchy, and for retrieving a second transition point located in said first hierarchy proximate to said first object point and retrieving a second complete route between said first object point and said second transition point, if said first object point is not one of said plurality of transition points between said first hierarchy and said hierarchy above said first hierarchy;

wherein said searching means conducts a second searching operation of said route memory for a complete route in said hierarchy above said first hierarchy between said first transition point and said second transition point;

means for operating said changing means, said retrieving means and said searching means until a complete route is found, wherein each time said changing means, said retrieving means and said searching means are operated, said first hierarchy in which a route is searched for is incremented to a next higher hierarchy, said first transition point becomes said first reference point and said second transition point becomes said first object point; and means for obtaining said complete route between said starting point and said destination point by combining all of said first routes, all of said second routes and said complete route.

15. A route selection apparatus for obtaining a complete route between two points on a connection network having a hierarchy structure and a plurality of points representing points on a map between which a person may travel, wherein said hierarchy structure includes a plurality of hierarchies from a lowest hierarchy to a highest hierarchy and said plurality of points are associated with at least one of said plurality of hierarchies, and wherein for each hierarchy there exists a plurality of migration points representing connection points between hierarchies, said apparatus comprising:

memory means for storing, in a memory in advance, data representing said plurality of points, data representing said migration points, data representing distance ranges associated with each of said migration points, and data representing a predetermined number of complete routes between points located in a same hierarchy, said points located in said same hierarchy including said points associated with that hierarchies and migration points associated with that hierarchy;

input means for selecting two points from said plurality of points in said connection network stored in said memory, said two points corresponding to a starting point and a destination point;

means for retrieving a first group of said migration points associated with said starting point, said first group of migration points including migration points associated with each hierarchy in said plurality of hierarchies, a first group of routes from said starting point to said first group of migration points, a second group of migration points associated with said destination point, said second group of migration points including migration points associated with each hierarchy in said plurality of hierarchies, and a second group of routes from said destination point to said second group of migration point;

determining means for determining whether any of said second group of migration points in a first hierarchy are within said distance ranges associated with said first group of migration points in said first hierarchy, and if not, for repeating said determining operation with respect to a next higher hierarchy until it is determined that at least one migration point from said second group of migration points is within a distance range of at least one migration point from said first group of migration points and retrieving all routes associated with said at least one migration point from said first group of migration points, and for determining whether said at least one migration point from said second group of migration points is included in any one of said routes associated with said at least one migration point from said first group of migration points; and obtaining means for obtaining a complete route from said starting point to said destination point if at least one migration point from said second group of migration points is included in any one of said routes associated with said at least one migration point from said first group of migration points, said complete route being obtained by connecting a first route from said starting point to said at least of one migration point from said first group of migration points, a second route from said destination point to said at least of one migration point from said second group of migration points, and a third route that includes said at least one migration point from said first group of migration points and said at least one migration point from said second group of migration points determined by said determining means.

16. A route selection apparatus according to claim 15, further comprising means for operating said determining means and said obtaining means, wherein each time said determining means and said obtaining means are operated a still higher hierarchy is used in said determining operation, if at least one migration point from said second group of migration points is not included in any one of said routes associated with said at least one migration point from said first group of migration points.

17. A route selection apparatus according to claim 15, further comprising means, if a plurality of routes exist after operating said determining means, for determining which of said plurality of route to be used said obtaining means based on characteristic data associated with said routes.

18. A route selection apparatus according to claim 17, wherein said characteristic data includes at least one of distance data, travel time, and traffic congestion.

* * * * *